US010309405B2

(12) United States Patent
Arensmeier et al.

(10) Patent No.: US 10,309,405 B2
(45) Date of Patent: Jun. 4, 2019

(54) ADAPTIVE CONTROL FOR MOTOR FAN WITH MULTIPLE SPEED TAPS

(71) Applicant: EMERSON ELECTRIC CO., St. Louis, MO (US)

(72) Inventors: Jeffrey N. Arensmeier, Fenton, MO (US); Paul Layton, Brentwood, MO (US); Jacob Nielson, O'Fallon, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 168 days.

(21) Appl. No.: 15/374,525

(22) Filed: Dec. 9, 2016

(65) Prior Publication Data

US 2017/0167744 A1 Jun. 15, 2017

Related U.S. Application Data

(60) Provisional application No. 62/265,645, filed on Dec. 10, 2015.

(51) Int. Cl.
*F24F 11/30* (2018.01)
*F04D 25/06* (2006.01)
(Continued)

(52) U.S. Cl.
CPC ............ *F04D 25/06* (2013.01); *F04D 25/08* (2013.01); *F04D 27/004* (2013.01); *F24F 11/30* (2018.01);
(Continued)

(58) Field of Classification Search
CPC ............. F24F 11/30; F24F 11/65; F24F 11/64
See application file for complete search history.

(56) References Cited

U.S. PATENT DOCUMENTS 4,488,823 A * 12/1984 Baker .................... F25B 49/02
  374/170
5,345,776 A * 9/1994 Komazaki ................ F24F 3/14
  62/176.3
(Continued)

FOREIGN PATENT DOCUMENTS

WO WO-2011133234 A2 10/2011

OTHER PUBLICATIONS

International Search Report regarding International Application No. PCT/US2016/065949, dated Mar. 27, 2017.
Written Opinion of the International Searching Authority regarding International Application No. PCT/US2016/065949, dated Mar. 27, 2017.

Primary Examiner — Ljiljana V. Ciric
Assistant Examiner — Alexis K Cox
(74) Attorney, Agent, or Firm — Harness, Dickey & Pierce, P.L.C.

(57) ABSTRACT

A circulator blower controller for a circulator blower of a heating, ventilation, and air conditioning (HVAC) system of a building includes an interface configured to receive a demand signal with an operating mode from a thermostat. A switching circuit selectively connects power to a tap of a motor of the circulator blower. A data store configured to store a mapping from a speed to the tap. For each tap, a processor observes power consumed by the circulator blower while power is connected to the tap by the switching circuit. The processor determines the mapping by sorting the taps based on observed power consumption. The processor selects a first speed based on the demand signal from the thermostat. The processor identifies a first tap from the mapping based on the first speed and generates the tap selection signal to control the switching circuit to connect power to the first tap.

20 Claims, 19 Drawing Sheets

(51) Int. Cl.
  F04D 25/08   (2006.01)
  F04D 27/00   (2006.01)
  F24F 11/77   (2018.01)
  *F24F 11/65*   (2018.01)
  *F24F 110/10*   (2018.01)
  *F24F 110/20*   (2018.01)
  *F24F 140/60*   (2018.01)
  *F24F 11/63*   (2018.01)
  *F24F 11/64*   (2018.01)

(52) U.S. Cl.
  CPC .............. *F24F 11/77* (2018.01); *F24F 11/63* (2018.01); *F24F 11/64* (2018.01); *F24F 11/65* (2018.01); *F24F 2110/10* (2018.01); *F24F 2110/20* (2018.01); *F24F 2140/60* (2018.01)

(56) References Cited

U.S. PATENT DOCUMENTS

| | | | |
|---|---|---|---|
| 5,492,273 | A | 2/1996 | Shah |
| 7,990,092 | B2 * | 8/2011 | Woodward ............... H02P 6/08 318/400.26 |
| 2011/0241580 | A1 * | 10/2011 | Winterhalter ........... H02P 27/06 318/400.3 |
| 2013/0061619 | A1 * | 3/2013 | Saitou ..................... F24F 11/77 62/89 |
| 2013/0127379 | A1 | 5/2013 | Woodward |
| 2014/0265989 | A1 | 9/2014 | Becerra et al. |
| 2015/0145457 | A1 | 5/2015 | Broker et al. |
| 2015/0362207 | A1 * | 12/2015 | Abiprojo ................. F24F 11/30 702/183 |

* cited by examiner

ADAPTIVE CONTROL FOR MOTOR FAN WITH MULTIPLE SPEED TAPS

CROSS-REFERENCE TO RELATED APPLICATIONS

This application claims the benefit of U.S. Provisional Application No. 62/265,645, filed Dec. 10, 2015. The entire disclosure of the application referenced above is incorporated by reference.

FIELD

The present disclosure relates to control of a multi-speed fan motor and more particularly to a controller for a circulator blower with multiple speed taps in a heating, ventilation, and air conditioning (HVAC) system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a building. The target values for the environmental parameters, such as a temperature set point, may be specified by a user or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. In addition, fresh air (sometimes called make up air) may be drawn from outside the building. The circulator blower 108, also referred to as a fan, is controlled by a control board 112. The control board 112 receives control signals (also referred to interchangeably as calls, service calls, and demand signals) from a thermostat 116. The control board 112 may be powered by incoming AC power.

For example only, the thermostat 116 may include one or more temperature set points specified by the user. Based on comparisons between the temperature set points and a measured temperature, the thermostat 116 provides heat and/or cool requests to the control board 112. When a heat request is made, the control board 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control board 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control board 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Monitoring of operation of components in the condensing unit 164 and the air handler unit 136 has traditionally been performed by an expensive array of multiple discrete sensors that measure current individually for each component. For example, a first sensor may sense the current drawn by a motor, another sensor measures resistance or current flow of an igniter, and yet another sensor monitors a state of a gas valve. However, the cost of these sensors and the time required for installation of, and taking readings from, the sensors has made monitoring cost-prohibitive.

The thermostat 116 may direct, via the control board 112, whether the circulator blower 108 is turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

SUMMARY

A circulator blower controller for a circulator blower of a heating, ventilation, and air conditioning (HVAC) system of a building includes an interface configured to receive a demand signal from a thermostat. The demand signal specifies an operating mode for the HVAC system. A switching circuit configured to, in response to a tap selection signal, selectively connect power to one of a plurality of taps of a motor of the circulator blower. A data store configured to store a mapping from a plurality of speeds to the plurality of taps. A processor configured to, for each tap of the plurality of taps, observe power consumed by the circulator blower while power is connected to the tap by the switching circuit. The processor determines the mapping by sorting the taps based on observed power consumption. The processor selects a first speed based on the demand signal from the thermostat. The processor identifies a first tap from the mapping based on the first speed. In response to identifying the first tap, the processor generates the tap selection signal to control the switching circuit to connect power to the first tap.

In other features, the circulator blower is included in a circulator blower system. The circulator blower includes (i) the motor and (ii) a fan driven by the motor and configured to circulate air within the building. In other features, the motor includes at least one of an electronically commutated motor (ECM) configured such that each of the plurality of taps instructs the ECM to run at a respective speed. A permanent split capacitor (PSC) motor including a winding and configured such that each of the plurality of taps corresponds to different points along the winding. In other features, the motor includes the ECM. A plurality of sensors that determine which of the plurality of taps is activated. A speed controller configured to control the ECM to rotate at a speed based on which of the plurality of taps is activated. In other features, the plurality of operating modes includes a cool mode and a fan only mode. In other features, the processor is configured to, in response to the demand signal specifying the fan only mode, set the first speed to a speed defined by a user of the building. In other features, the plurality of operating modes further includes a heat mode. The processor is configured to, in response to the demand signal specifying the heat mode, set the first speed to a speed defined by a user of the building.

In other features, in response to the demand signal specifying the cool mode, the processor is configured to select the first speed according to a predetermined initial speed. After a first predetermined period of time following selection of the first speed, select a second speed that is faster than the first speed. In response to selection of the second speed, the processor is configured to (i) identify a second tap from the mapping based on the second speed and (ii) generate the tap selection signal to control the switching circuit to connect power to the second tap. In other features, the predetermined initial speed is a lowest speed of the circulator blower. In other features, in response to the demand signal specifying the cool mode, the processor is configured to, after a second predetermined period of time following selection of the second speed, select a third speed that is faster than the second speed. In response to selection of the third speed, the processor is configured to (i) identify a third tap from the mapping based on the third speed and (ii) generate the tap selection signal to control the switching circuit to connect power to the third tap.

In other features, in response to the demand signal specifying the cool mode, the processor is configured to select the first speed according to a predetermined initial speed. The processor is configured to evaluate an operating condition of the HVAC system. The processor is configured to, in response to the operating condition of the HVAC system meeting a first predetermined criterion, select a second speed that is faster than the first speed. The processor is configured to, in response to selection of the second speed, identify a second tap from the mapping based on the second speed and generate the tap selection signal to control the switching circuit to connect power to the second tap. In other features, the operating condition of the HVAC system is temperature split. The temperature split is based on a difference between supply air leaving an evaporator coil of the HVAC system and return air arriving at the evaporator coil. The processor is configured to integrate time periods during which the temperature split diverged from a predetermined temperature profile. The first predetermined criterion is the integration exceeding a first threshold. In other features, the processor is configured to, in response to determining that a humidity in a conditioned space of the building exceeds a desired humidity, increase the first threshold.

In other features, the processor is configured to perform the integration by, for each time period during which the temperature split diverged from the predetermined temperature profile, adding a product of a gain factor and a length of the time period to an accumulator register. In other features, the processor is configured to, in response to selection of the second speed, (i) evaluate the operating condition of the HVAC system and, (ii) in response to the operating condition of the HVAC system meeting a second predetermined criterion, select a third speed that is faster than the second speed. In response to selection of the third speed, the processor is configured to (i) identify a third tap from the mapping based on the third speed and (ii) generate the tap selection signal to control the switching circuit to connect power to the third tap. The second predetermined criterion is the integration exceeding a second threshold. In other features, the processor is configured to, after a first predetermined period of time following selection of the first speed, select the second speed.

In other features, the processor is configured to, in response to determining that a humidity in a conditioned space of the building exceeds a desired humidity, increase the first predetermined period of time. In other features, in response to the demand signal specifying the cool mode, the processor is configured to selectively determine a refrigerant undercharge condition of the HVAC system. In response to determining the refrigerant undercharge condition, the processor is configured to (i) select a slower speed, (ii) identify a second tap from the mapping based on the slower speed, and (iii) generate the tap selection signal to control the switching circuit to connect power to the second tap. In other features, the processor is configured to, until the mapping includes entries for all of the plurality of taps, observe the power consumed. Observing the power consumed includes, while no demand signal is received from the thermostat, iterating through taps of the plurality of taps by generating the tap selection signal to control the switching circuit to connect power to an evaluation tap and observing the power consumed while power is connected to the evaluation tap. In other features, the processor is configured to generate the tap selection signal to control the switching circuit to connect power to a second tap in response to determining that the motor is not operating while power is connected to the first tap.

A method of controlling a motor in a heating, ventilation, and air conditioning (HVAC) system of a building, the method includes receiving a demand signal from a thermostat. The demand signal specifies an operating mode for the HVAC system. In response to a tap selection signal, the method includes selectively connecting power to one of a plurality of taps of the motor. The method includes storing a mapping from a plurality of speeds to the plurality of taps. The method includes for each tap of the plurality of taps, observing power consumed by the motor while power is connected to the tap by a switching circuit. The method includes determining the mapping by sorting the taps based on observed power consumption. The method includes selecting a first speed based on the demand signal from the thermostat. The method includes identifying a first tap from the mapping based on the first speed. The method includes, in response to identifying the first tap, generating the tap selection signal to control the switching circuit to connect power to the first tap.

In other features, the motor drives a fan configured to circulate air within the building. In other features, the plurality of operating modes includes a cool mode and a fan only mode. In other features, the method includes, in response to the demand signal specifying the fan only mode, setting the first speed to a speed defined by a user of the building. In other features, the plurality of operating modes further includes a heat mode. The method includes, in response to the demand signal specifying the heat mode, setting the first speed to a speed defined by a user of the building. In other features, the method includes, in response to the demand signal specifying the cool mode. The method includes selecting the first speed according to a predetermined initial speed. After a first predetermined period of time following selection of the first speed, the method includes selecting a second speed that is faster than the first speed. In response to selection of the second speed, the method includes (i) identifying a second tap from the mapping based on the second speed and (ii) generating the tap selection signal to control the switching circuit to connect power to the second tap. In other features, the predetermined initial speed is a lowest speed of the motor.

In other features, the method includes, in response to the demand signal specifying the cool mode, after a second predetermined period of time following selection of the second speed, selecting a third speed that is faster than the second speed. In response to selection of the third speed, the method includes (i) identifying a third tap from the mapping based on the third speed and (ii) generating the tap selection signal to control the switching circuit to connect power to the third tap. In other features, the method includes, in response to the demand signal specifying the cool mode, selecting the first speed according to a predetermined initial speed. The method includes evaluating an operating condition of the HVAC system. In response to the operating condition of the HVAC system meeting a first predetermined criterion, the method includes selecting a second speed that is faster than the first speed. In response to selection of the second speed, the method includes (i) identifying a second tap from the mapping based on the second speed and (ii) generating the tap selection signal to control the switching circuit to connect power to the second tap. In other features, the operating condition of the HVAC system is temperature split. The temperature split is based on a difference between supply air leaving an evaporator coil of the HVAC system and return air arriving at the evaporator coil. The method includes integrating time periods during which the temperature split diverged from a predetermined temperature profile. The first predetermined criterion is the integration exceeding a first threshold.

In other features, the method includes, in response to determining that a humidity in a conditioned space of the building exceeds a desired humidity, increasing the first threshold. In other features, the method includes perform the integration by, for each time period during which the temperature split diverged from the predetermined temperature profile, adding a product of a gain factor and a length of the time period to an accumulator register. In other features, the method includes, in response to selection of the second speed, (i) evaluating the operating condition of the HVAC system and (ii) in response to the operating condition of the HVAC system meeting a second predetermined criterion, selecting a third speed that is faster than the second speed. In response to selection of the third speed, the method include (i) identifying a third tap from the mapping based on the third speed and (ii) generating the tap selection signal to control the switching circuit to connect power to the third tap. The second predetermined criterion is the integration exceeding a second threshold. In other features, the method includes, after a first predetermined period of time following selection of the first speed, selecting the second speed.

In other features, the method includes, in response to determining that a humidity in a conditioned space of the building exceeds a desired humidity, increasing the first predetermined period of time. In other features, the method includes, in response to the demand signal specifying the cool mode, selectively determining a refrigerant undercharge condition of the HVAC system. In response to determining the refrigerant undercharge condition, the method (i) selecting a slower speed, (ii) identifying a second tap from the mapping based on the slower speed, and (iii) generating the tap selection signal to control the switching circuit to connect power to the second tap. In other features, the method includes, until the mapping includes entries for all of the plurality of taps, observing the power consumed. The method includes observing the power consumed includes, while no demand signal is received from the thermostat, iterating through taps of the plurality of taps by generating the tap selection signal to control the switching circuit to connect power to an evaluation tap and observing the power consumed while power is connected to the evaluation tap. In other features, the method includes generating the tap selection signal to control the switching circuit to connect power to a second tap in response to determining that the motor is not operating while power is connected to the first tap.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Monitoring System

According to the present disclosure, a circulator blower controller can be integrated with a residential or light commercial HVAC (heating, ventilation, or air conditioning) system of a building. The circulator blower controller can control motor speeds of a circulator blower by connecting to one of a plurality of taps of the motor such to thereby improve the performance and/or efficiency of the HVAC system.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, and air conditioners. HVAC systems as described in this application do not necessarily include both heating and air conditioning, and may instead have only one or the other.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
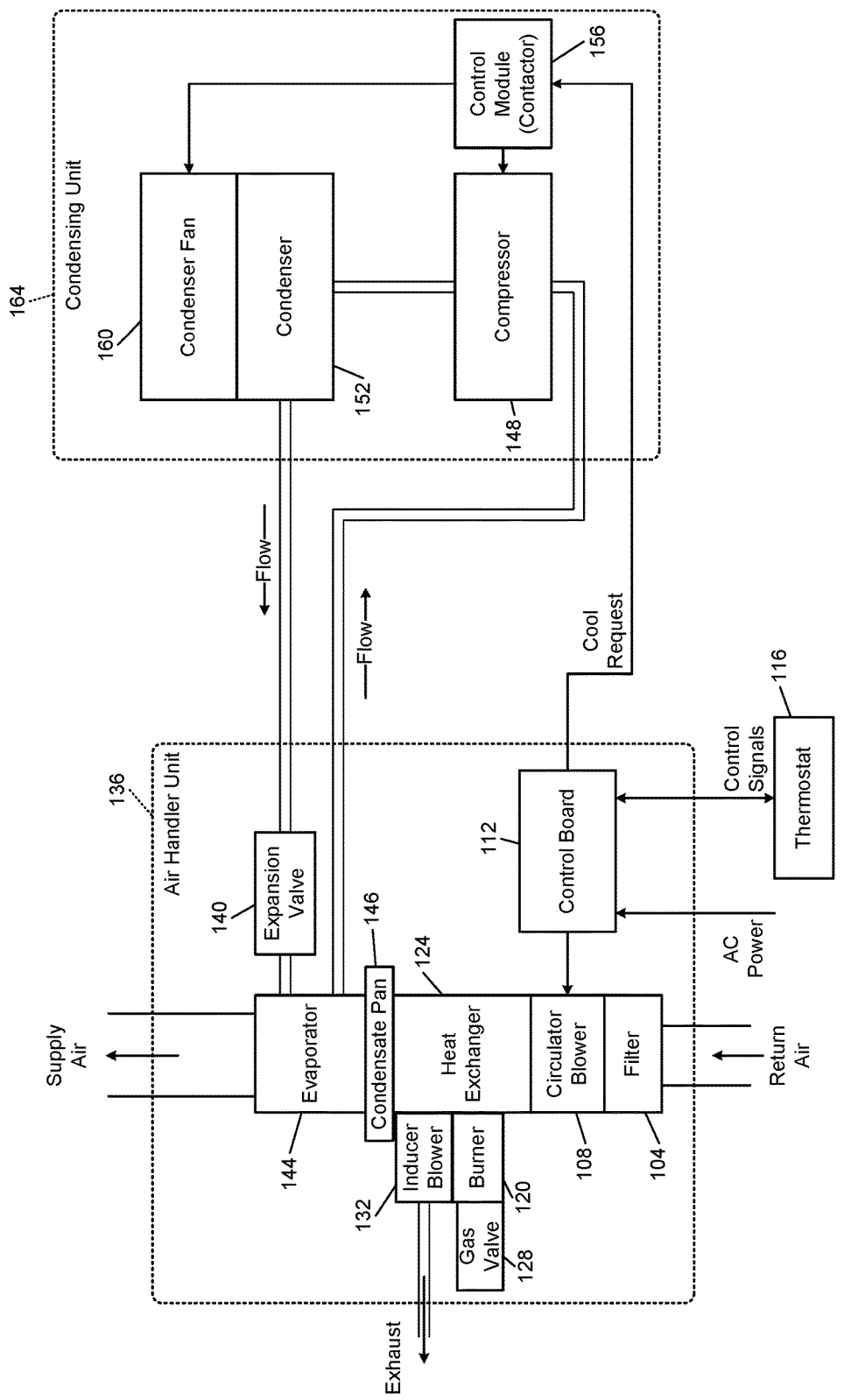
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building. When the flow of refrigerant is reversed, the roles of the evaporator and condenser are reversed—i.e., refrigerant evaporation occurs in what is labeled the condenser while refrigerant condensation occurs in what is labeled as the evaporator.

The air handler monitor and condensing monitor modules monitor operating parameters of associated components of the HVAC system. For example, the operating parameters may include operation status, refrigerant charge condition, airflow, return/supply air temperature split, humidity of inside and outside air, power supply current, power supply voltage, operating and ambient temperatures of inside and outside air, refrigerant temperatures at various points in the refrigerant loop, fault signals, and control signals.

The principles of the present disclosure may be applied to control motor speed of other circulator blower machines. A motor control circuitry may be integrated within the air handler unit to control the motor speed of the circulator blower machine based on the operating parameters provided by the monitoring system.

The air handler monitor and condensing monitor modules may communicate data between each other, while one or both of the air handler monitor and condensing monitor modules upload data to a remote location, or download data from a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as designated HVAC contractors.

The remote location may also include a cloud, which will be referred to as remote storage. The monitoring system receives profile data from the remote storage and provides the profile data for staging operation of the HVAC system when a call for cool is received.

A server of the monitoring system includes a processor and memory. The memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Based on measurements from the air handler monitor and condensing monitor modules, the monitoring company can determine a status of the HVAC system and can change the fan motor speed of the HVAC system when the status of the HVAC system is abnormal. This status may be measured for the system as a whole, such as in terms of efficiency, refrigerant charge, etc., and/or may be monitored for one or more individual components, such as tap order/condition of a fan motor, airflow of the evaporator, return/supply air temperature split of an air handler unit, humidity of inside and outside air, operating and ambient temperatures of inside and outside air, refrigerant temperatures at various points in the refrigerant loop, fault signals, and control signals.

In addition, the monitoring system may detect abnormal configuration of the fan motor, such as a tap failure or taps of the fan motor connected out of order. When a failure is detected, the motor control circuitry can be notified and potential remediation steps can be taken immediately. For example, a different tap of the fan motor may be selected and the selected tap connected to operate the fan motor at a different speed.

Figure 2A:
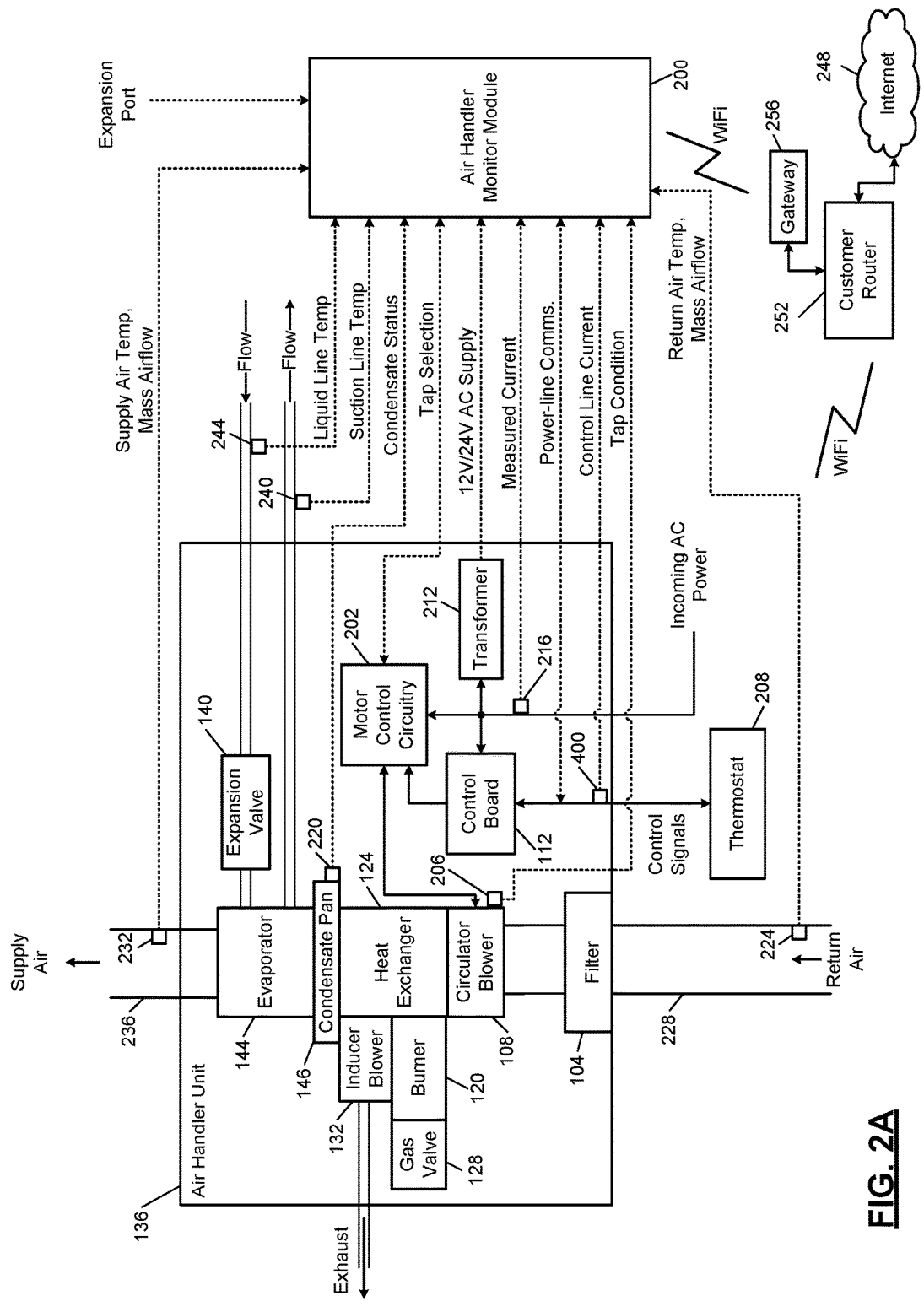
FIG. 2A is a functional block diagram of an example HVAC system including an implementation of an air handler monitor module and a motor control circuitry.
Figure 2B:
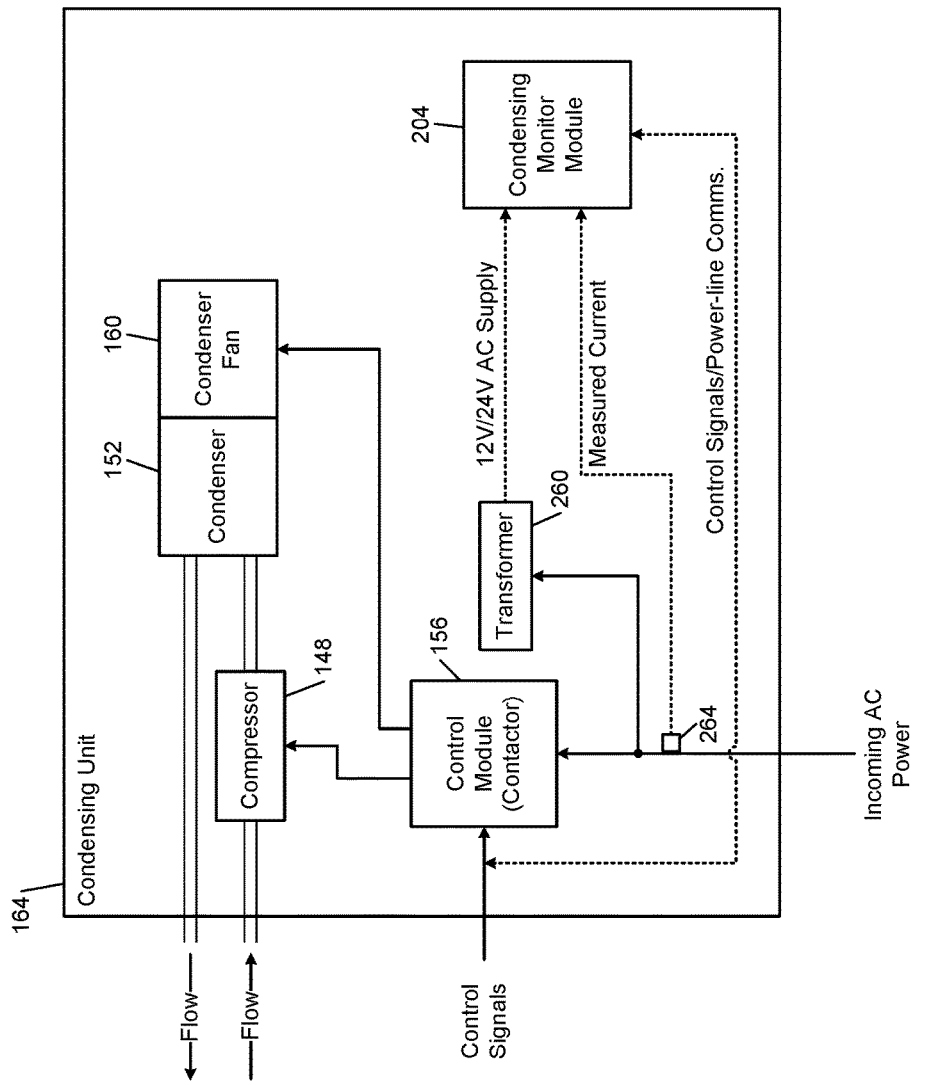
FIG. 2B is a functional block diagram of an example HVAC system including an implementation of a condensing monitor module.

FIGS. 2A-2B are functional block diagrams of an example air handler unit 136 including a motor control circuitry 202 and a monitoring system associated with an HVAC system of a building. The air handler unit 136 of FIG. 1 is shown for reference. Because the monitoring systems of the present disclosure can be used in retrofit applications, elements of the air handler unit 136 may remain unmodified. An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capability.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120 volt or nominal 240 volt power. The air handler monitor module 200 then receives power from the transformer 212 and determines the AC line voltage based on the power received from the transformer 212. In various implementations, the transformer 212 may be eliminated, powering the air handler monitor module 200 directly from incoming AC power. In such cases, power-line communications may be conducted over the incoming AC power lines rather than the thermostat control signals.

A current sensor 216 measures incoming current to the air handler unit 136. The current sensor 216 may include a current transformer that snaps around one power lead of the incoming AC power. The current sensor 216 may alternatively include a current shunt or a hall effect device. In various implementations, a power sensor (not shown) may be used in addition to or in place of the current sensor 216.

In various other implementations, electrical parameters (such as voltage, current, and power factor) may be measured at a different location, such as at an electrical panel providing power to the building from the electrical utility.

The control board 112 is also powered by the transformer 212 and connected to the motor control circuitry 202 and sensors of the air handler unit 136. For simplicity of illustration, routing of the AC power to various powered components of the air handler unit 136, such as the circulator blower 108, the gas valve 128, and the inducer blower 132, are not shown. The current sensor 216 measures the current entering the air handler unit 136 and therefore represents an aggregate current of the current-consuming components of the air handler unit 136.

The control board 112 controls tap selection of the circulator blower 108 in response to signals from a thermostat 208 received over control lines and/or in response to signals from the air handler monitor module 200 over tap control line. The air handler monitor module 200 monitors the control lines. The control lines may carry a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as operation status, refrigerant charge condition, airflow, return/supply air temperature split, humidity of inside and outside air, operating and ambient temperatures of inside and outside air, refrigerant temperatures at various points in the refrigerant loop, fault signals (e.g., tap failure, out of order tap configuration, closed vent, etc.), a defrost status signal, which may be asserted when the compressor is shut off and a defrost heater operates to melt frost from an evaporator.

The control lines may be monitored by attaching leads to terminal blocks at the control board 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a signal screw head.

In various implementations, the cool signal from the thermostat 208 may be disconnected from the control board 112 and attached to the air handler monitor module 200. The air handler monitor module 200 can then provide a switched cool signal to the control board 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

In various implementations, the air handler monitor module 200 can provide tap control signals to the motor control circuitry 202 to connect the fan motor to a selected tap to thereby operate the fan motor at a speed according to a speed map in response to the operating status of the HVAC system and/or the sensed ambient condition. The speed map can be constructed for the fan motor of the circulator blower 108 by invoking staging operations. The plurality of taps of the fan motor may further be sorted according to the speed map and labeled with the sorted orders.

In various implementations, tap sensors 206 (such as voltage sensors) may be located on each of the plurality taps of the circulator blower 108 to detect a tap failure or a tap connection status. For example, the tap sensor 206 may indicate to the air handler monitor module 200 whether the power for each individual lead from the motor control circuitry is reaching the corresponding tap on the circulator blower 108. In other implementations, the tap sensors 206 may be eliminated.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

In various implementations, only one of the return air sensor 224 and/or the supply air sensor 232 is present. In various implementations, the return air sensor 224 and/or the supply air sensor 232 may be able to measure both temperature and humidity. In such implementations, a mass airflow sensor may be installed along with one or both of the return air sensor 224 and the supply air sensor 232. For example, a mass airflow sensor and the return air sensor 224 may be contained in a package and installed into the return air plenum 228 as one unit.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148 of FIG. 2B. A liquid line temperature sensor 244 measures the temperature of refrigerant in a liquid line traveling from the condenser 152 of FIG. 2B to the expansion valve 140 of FIG. 2A.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 of FIG. 2B, these control signals can be used for communication between the air handler monitor module 200 and the condensing monitor module 204 of FIG. 2B.

The air handler monitor module 200 may transmit frames of data corresponding to periods of time. For example only, 7.5 frames may span one second (i.e., 0.1333 seconds per frame). Each frame of data may include voltage, current, temperatures, control line status, and water sensor status. Calculations may be performed for each frame of data, including averages, powers, RMS, and FFT. Then the frame is transmitted to the monitoring system.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, WiFi (IEEE 802.11). In various implementations, a gateway 256 is implemented, which creates a wireless network with the air handler monitor module 200. The gateway 256 may interface with the customer router 252 using a wireless or wired protocol, such as Ethernet (IEEE 802.3). In some implementations, the air handler monitor module 200 may communicate with the gateway 256 using power-line communications.

The thermostat 208 may also communicate with the customer router 252 using WiFi. Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on inputs from the other. For example, various faults identified based on information from the air handler monitor module 200 may cause the remote monitoring system to adjust temperature set points of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over a lower-voltage HVAC control line.

In various implementations, the current sensor 216 may be omitted, and instead a voltage sensor (not shown) may be used. The voltage sensor measures the voltage of an output of a transformer internal to the control board 112, the internal transformer providing the power (e.g., 24 Volts) for the control signals. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor. In various implementations, the transformer 212 may be eliminated, powering the condensing unit 164 directly from incoming AC power. In such cases, power-line communications may be conducted over the incoming AC power lines rather than the thermostat control signals.

A liquid line temperature sensor 244 measures the temperature of refrigerant traveling from the condenser 152 to the air handler unit 136. In various implementations, the liquid line temperature sensor 244 is located prior to any filter-drier (not shown).

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on geographical location of the building may be used to determine sun load, outside ambient air temperature, precipitation, and humidity.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over a lower-voltage HVAC control line.

Figure 2C:
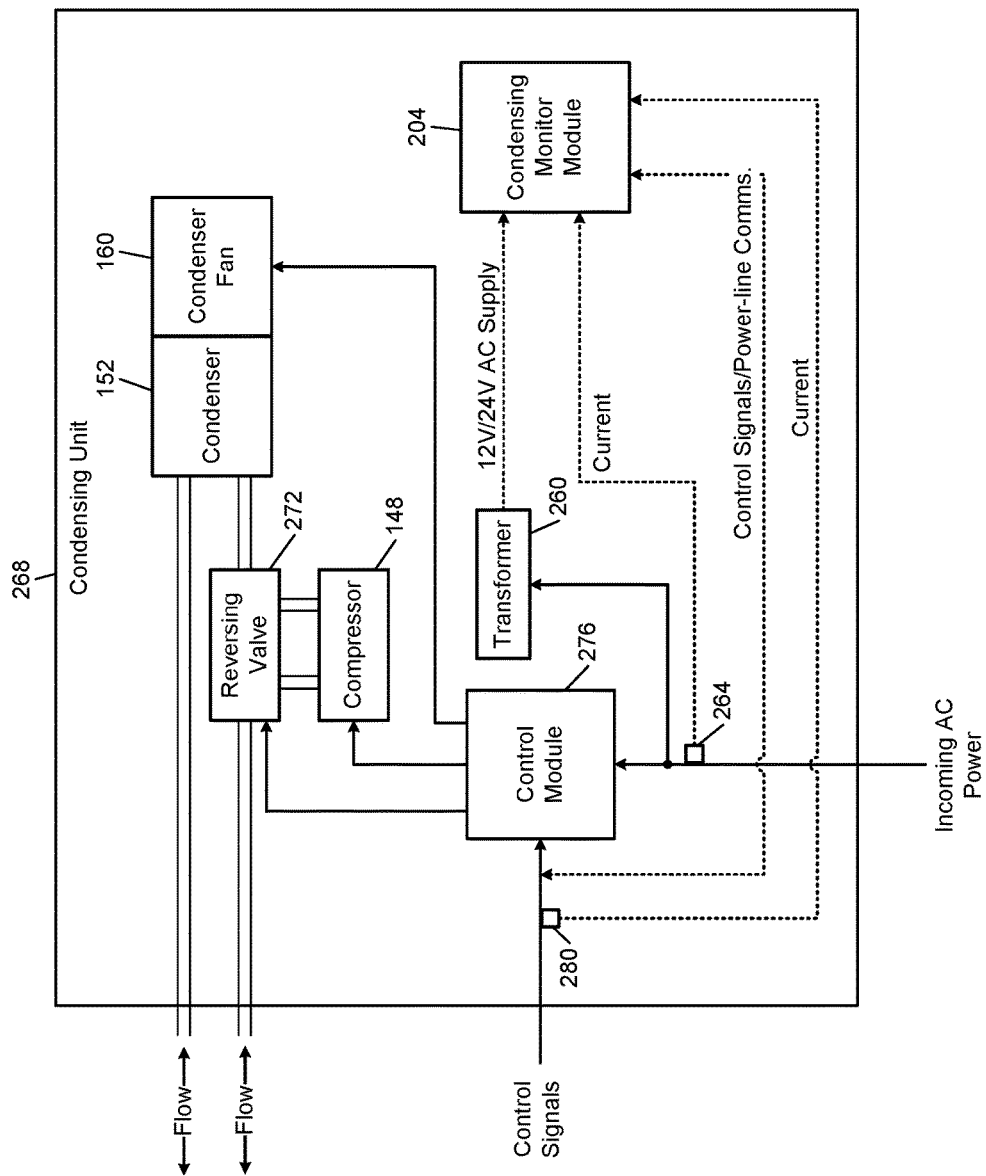
FIG. 2C is a functional block diagram of an example HVAC system based on a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

In various implementations, a current sensor 280 is implemented to measure one or more currents of the control signals. The current sensor 280 may measure an aggregate current of all the control lines arriving at the condensing unit 268. The aggregate current may be obtained by measuring the current of a common control return conductor. The aggregate current measured by the current sensor 280 may be used to determine the state of multiple heat pump control signals, such as signals that control operation of defrosting functions and the reversing valve. The aggregate current measured by the current sensor 280 may also be used to determine the state of calls for varying levels of compressor capacity. While not shown, the current sensor 280 may similarly be installed in the condensing unit 164.

Figure 3:
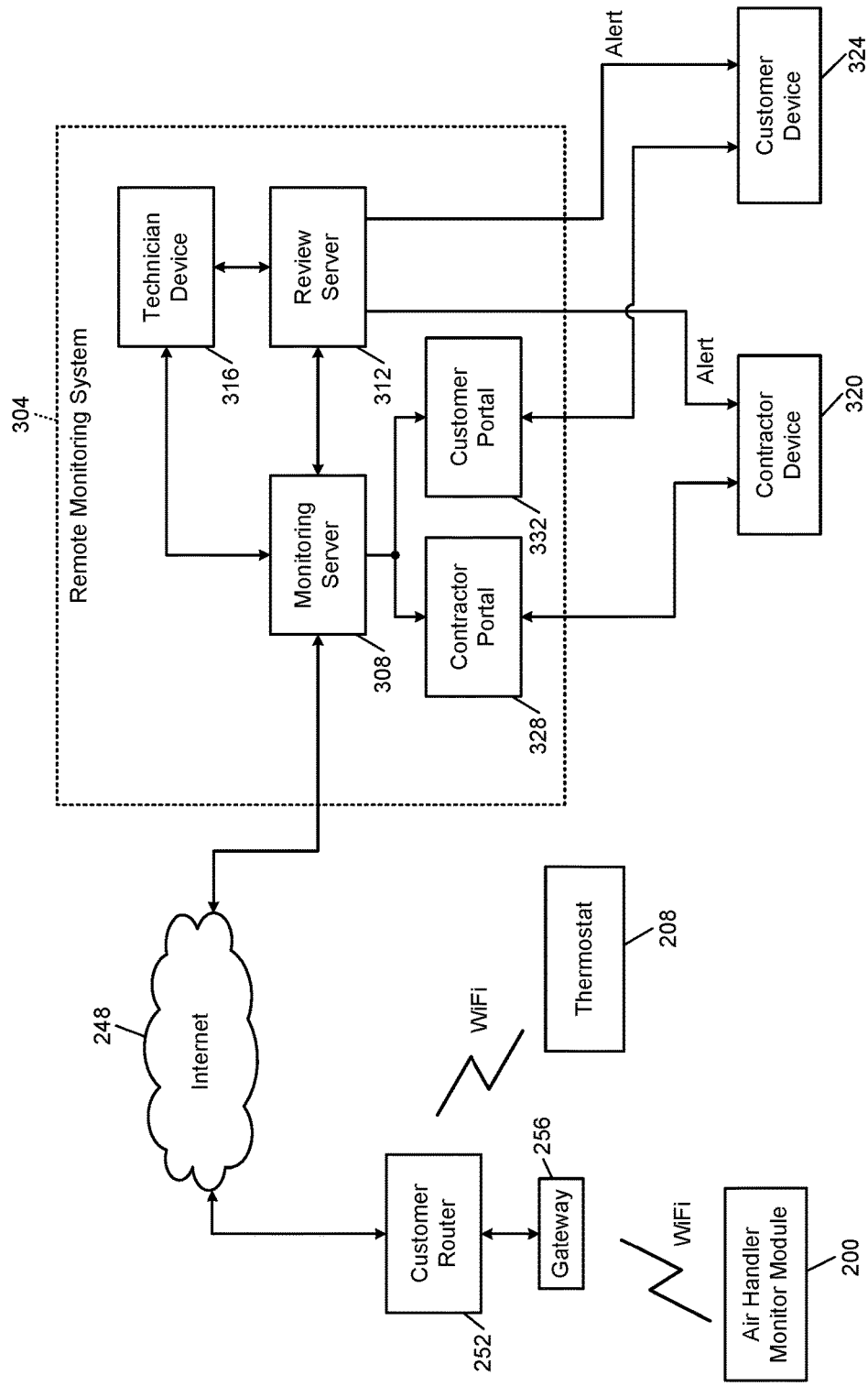
FIG. 3 is a high level functional block diagram of an example system including an implementation of a remote monitoring system.

In FIG. 3, the air handler monitor module 200 and the thermostat 208 are shown communicating, using the customer router 252, with a remote monitoring system 304 via the Internet 248. In various implementations, the remote monitoring system may transmit data from a remote storage to the monitoring server for staging operations. For example, profiles including timing factors and/or gains factors for determining whether to switch the tap for a different fan motor speed during the staging operations. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 304 includes a monitoring server 308 that receives data from the air handler monitor module 200 and the thermostat 208 and maintains and verifies network continuity with the air handler monitor module 200. The monitoring server 308 executes various algorithms to identify problems and/or solve problems, such as failures or decreased efficiency, refrigerant undercharge condition, tap failure, closed vent(s), abnormal return/supply air temperature split, deviation from desired humidity, and/or taps on the fan motor connected out of order.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both a contractor device 320 or a customer device 324. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network. For example only, the technician device 316 may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

In various implementations, some of all of the functionality of the remote monitoring system 304 may be local instead of remote from the building. For example only, some or all of the functionality may be integrated with the air handler monitor module 200 or the condensing monitor module 204. Alternatively, a local controller may implement some of all of the functionality of the remote monitoring system 304.

Detection of various faults may require knowledge of which mode the HVAC system is operating in, and more specifically, which mode has been commanded by the thermostat. A heating fault may be identified when, for a given call for heat pattern, the supply/return air temperature split indicates insufficient heating. The threshold may be set at a predetermined percentage of the expected supply/return air temperature split. For additional discussion of fault/failure detection using the above system, see U.S. patent application Ser. No. 14/212,632, filed Mar. 14, 2014, with first-named inventor Jeffrey Arensmeier, titled "HVAC System Remote Monitoring and Diagnosis," the entire disclosure of which is incorporated by reference.

Returning back to FIG. 2A, in order for the monitoring system to determine which mode the HVAC system is operating in, each control signal between the thermostat 208 and the control board 112 may be monitored. Because the monitoring system of the present disclosure can be used in a retrofit environment, this may require connecting leads to each of the control lines. Making individual connections requires additional installation time and therefore expense. As the number of connections increase, the number of opportunities for a loose connection, and therefore erroneous readings, increase.

Further, because connecting leads may require removing and reattaching control lines from the control module, the loose connection may even affect normal operation of the HVAC system, such as the ability of the thermostat 208 to control certain aspects of the control board 112. Further, a location at which the control lines are accessible may be difficult for an installer to reach without removing other components of the HVAC system, which increases installation time and also increases the risk of introducing problems.

With multiple connections, even when the control lines are successfully connected, there is a risk that the connections will be misidentified—e.g., leading the monitoring system to believe that a call for cool has been made by the thermostat 208 when, in fact, a call for heat was instead made. Some HVAC systems may use those control lines in a non-standard way. Again, this may lead to misinterpretation of the control signals by the monitoring system. A further complication is introduced by "communicating systems," which do not rely on standard HVAC control lines and instead multiplex multiple signals onto one or more control lines. For example only, in a communicating system the thermostat 208 and the control board 112 may perform bidirectional digital communication using two or more lines. As a result, individual control lines corresponding to each mode of operation of the HVAC system may not be present.

The present disclosure presents an alternative to individually sensing the control lines and this alternative may eliminate or mitigate some or all of the issues identified above. When the thermostat 208 makes a call for heat, one or more components of the HVAC system will draw a current to service the call for heat. For example, a relay (not shown) may be energized to open the gas valve 128.

Meanwhile, when a call for cool is made by the thermostat 208, other components may draw a current—for example, a relay may control the control module 156.

The current consumed by these various devices may be different. For example, the current required to close a switch of the control module 156 may be greater than the current required to open the gas valve 128. An aggregate control line current may therefore uniquely indicate various modes of operation. In FIG. 2A, a current sensor 216 is shown associated with the control signals exchanged between the thermostat 208 and the control board 112. The current is received by the air handler monitor module 200.

In some HVAC systems, the difference in current between two different modes may not be distinguishable with sufficient accuracy. For these situations, additional sensing may be required. For example, a sensor may be connected to a specific control line to provide additional information so that the mode of operation can be disambiguated.

Multi-Tap Selection

Figure 4:
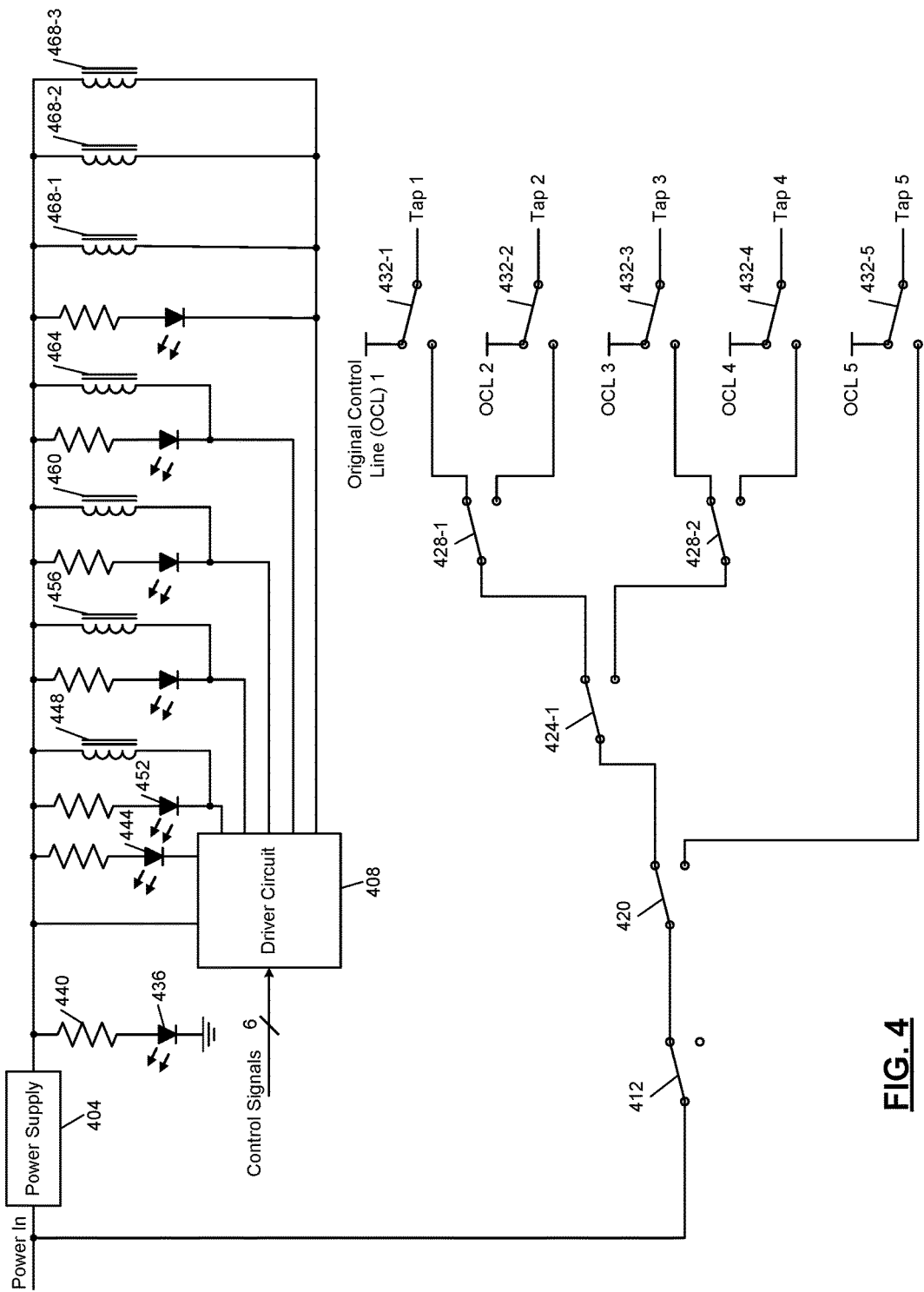
FIG. 4 is a schematic diagram of example motor control circuitry for driving a fan with up to five taps.

In FIG. 4, a power supply 404 receives the line power that is eventually used to power the motor. The power supply 404 converts the line power into power for driving relays, light-emitting diodes (LEDs), and a driver circuit 408. For example, the power supply 404 may include a rectifier and a voltage regulator that produce a DC power supply.

In this example, five taps and five control lines are described, though greater or fewer may be implemented. The motor tap connections are labelled as Tap 1, Tap 2, Tap 3, Tap 4, and Tap 5. FIG. 4 is a retrofit example in which there are original control lines from the preexisting control board. The original control lines are labeled as OCL 1, OCL 2, OCL 3, OCL 4, and OCL 5.

A first relay 412 connects and disconnects the input power from a binary tree 416 of relays. While use of a binary tree is not necessary, it may allow for using a fewer number of relays. In the example of FIG. 4, where there are more than four ($2^2$) taps but no more than eight ($2^3$) taps, a three-deep binary tree is used. The binary tree 416 includes a first level relay 420, a second level relay 424-1, and third level relays 428-1 and 428-2.

The binary tree 416 thereby connects the relay 412 to one of the five taps. The relay 412 may be oversized or otherwise designed to be less sensitive to voltage and current transients and may therefore be disconnected before changing the state of the binary tree 416. By making the relay 412 more robust and using it to disconnect power from the relays in the binary tree 416, the relays in the binary tree 416 can be smaller and/or less expensive without sacrificing their longevity.

A set of final connection relays 432-1, 432-2, 432-3, 432-4, and 432-5 (collectively, relays 432) connect the motor taps to either the original set of control lines or respective lines of either the binary tree 416. The relay 432s may be controlled together according to a single control signal.

The relays 432 may be configured such that, in the absence of power, a spring or other mechanism returns the relay 432s to a state that connects the motor taps to the original control lines. In this way, if there is a fault in the new motor control circuitry, the motor will be connected to the original control lines, preserving as much motor functionality as possible.

The driver circuit 408 receives power from the power supply and drives a number of outputs based on a corresponding number of inputs. In the example of FIG. 4, the driver circuit 408 receives six input signals (not shown individually) and drives six output signals. Each driver may be a single transistor or, in another implementation, may be a Darlington pair with a flyback diode. In various implementations, the driver circuit 408 may be implemented by an eight-input, eight-output integrated circuit with two of the inputs and outputs unused.

In some implementations, a microcontroller may be implemented that receives a digital signal (such as over a serial bus) indicating which tap to select, and generates individual output signals accordingly. The driver circuit 408 may or may not be used, depending on the current drive capability of the microcontroller.

A light emitting diode (LED) 436 is powered directly by the power supply 404 and therefore indicates whether the power supply 404 is generating DC power. A resistor 440 allows for a voltage drop between the power supply 404 and the diode 436.

An LED 444 is driven by the driver circuit 408 according to one of the inputs. The LED 444 is therefore under the control of the input signals and can be implemented solidly or with a flashing pattern to indicate operation or to signal error messages. The remaining resistors of FIG. 4 function similarly to the resistor 440—allowing a voltage drop between a respective LED and the power supply 404—and will therefore not be discussed individually.

The driver circuit 408 also controls a coil 448 corresponding to the relay 412, which connects and disconnects the binary tree 416 from the input power. Connected in parallel to the coil 448 is an LED 452, which therefore lights up to indicate that the coil 448 is being driven. The remaining LEDs in FIG. 4 will not be individually discussed because they operate similarly to the LED 452, indicating when a corresponding coil is being energized.

The relays of the binary tree 416 are controlled by coils 456, 460, and 464. As an example, the coil 456 controls the relay 420, the coil 460 controls the relay 424, and the coil 464 controls the relay 428-1 and 428-2. If one additional tap were present, a relay 424-2 may be added, which may be controlled by the same coil 460 that controls the relay 424-1. Adding additional taps can then be accomplished by adding additional relays 428s, which may all be controlled by the coil 464. In terms of nomenclature, the relay 424-1 in FIG. 4 is a single-pole double-throw switch, while the relays 428-1 and 428-2 together are a double-pole double-throw switch.

Coils 468-1, 468-2, and 468-3 (collectively, coils 468) are controlled together and operate the relays 432. Although there are five relays 432, the coils 468 may be double-pole double-throw switches, allowing up to six relays to be controlled by the three coils 468.

Figure 5:
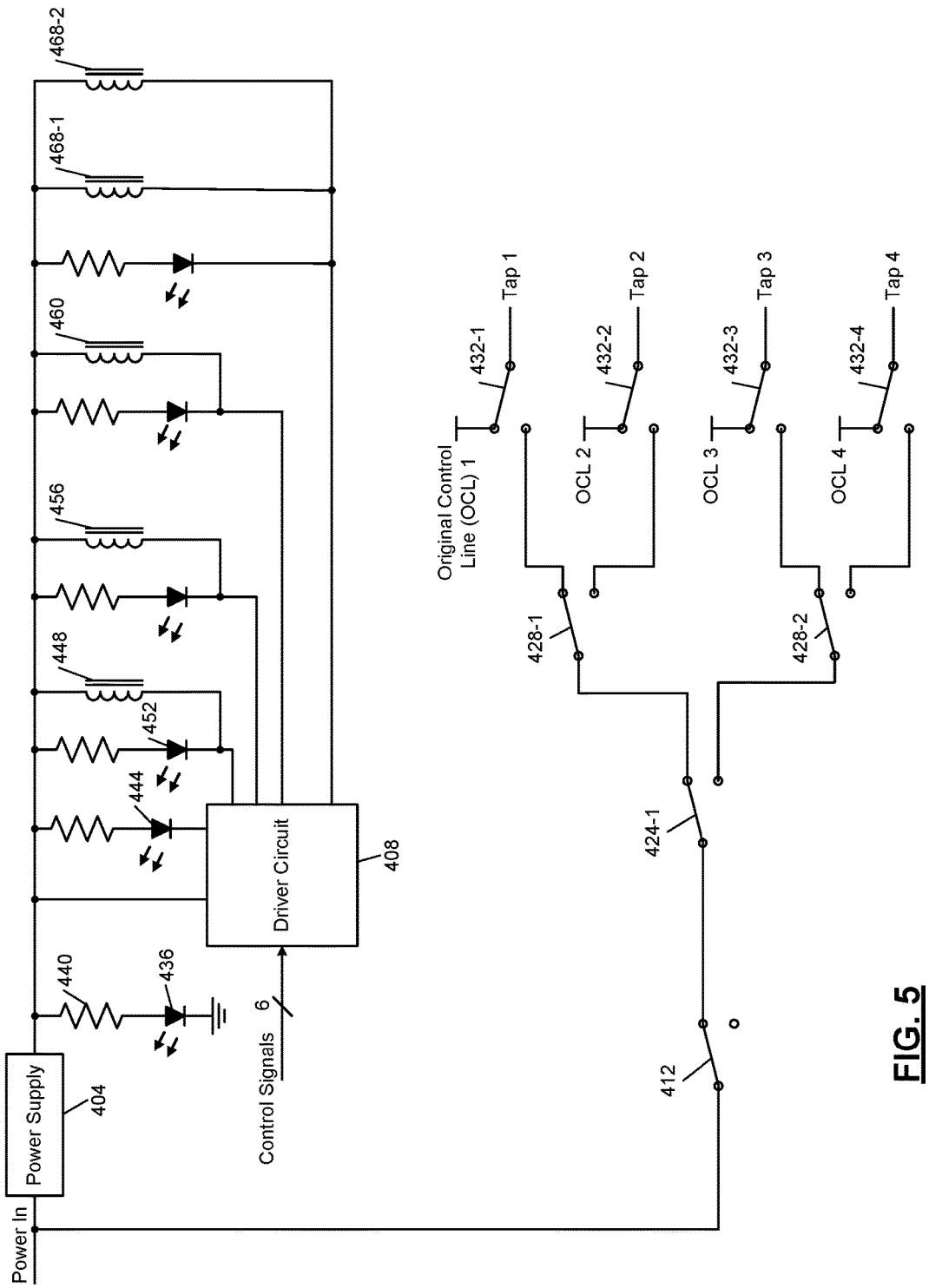
FIG. 5 is a schematic diagram of example motor control circuitry for driving a fan with up to four taps.

In FIG. 5, another example circuit is shown for selectively energizing motor taps. FIG. 5 includes elements similar to those of FIG. 4 and is limited to four taps. As a result of the fewer number of taps, certain components of FIG. 4 can be eliminated.

Figure 6:
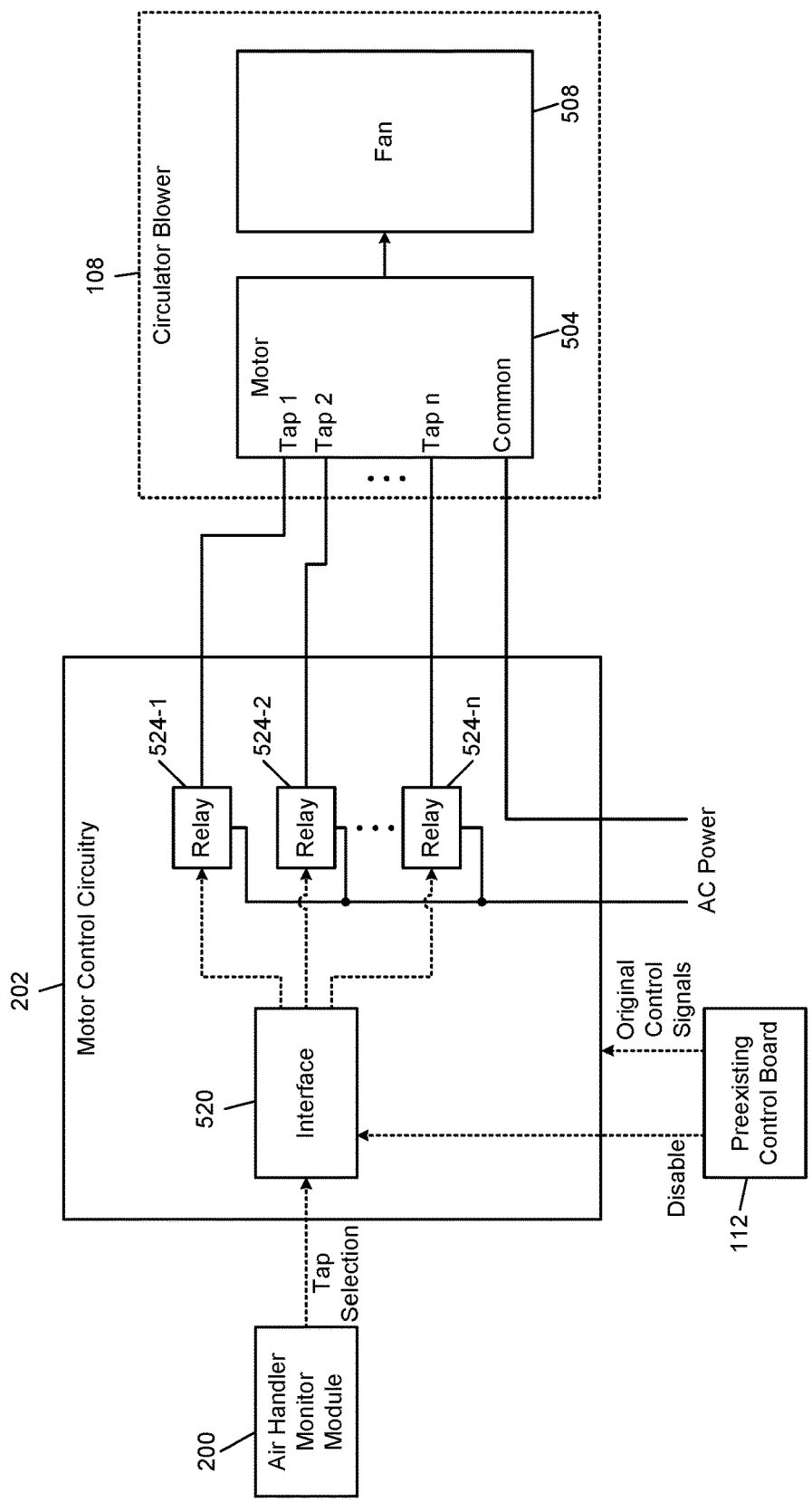
FIG. 6 is a functional block diagram of an example motor system including three taps corresponding to three motor speeds.

In FIG. 6, a functional block diagram of motor hardware includes the motor control circuitry 202 and the circulator blower 108. The circulator blower 108 includes a motor 504 that drives a fan 508. For example only, the fan may include blades directly affixed to a rotating shaft of the motor 504. For certain types of motors, such as permanent split capacitor (PSC) motors, speed of the motor can be controlled by applying power to a different one of multiple taps.

For example, the motor 504 is shown with three taps (tap 1, tap 2, and tap 3) and a common terminal. Applying power between tap 1 and the common terminal will operate the motor 504 at a first speed, applying power between tap 2 and the common terminal will operate the motor 504 at a second speed, and applying power between tap 3 and the common terminal will operate the motor 504 at a third speed. This pattern remains the same for motors that have more or fewer taps, such as 4-tap motors, 5-tap motors, etc.

Generally, the speeds that the motor can run at will increase or decrease from a first tap to a last tap. However, the taps of motors are often connected incorrectly when a system is installed or serviced. Therefore, taps 1-3 of the motor 504 may not necessarily correspond to an increasing set of three speeds. Because the motor control circuitry 202 may not know which tap corresponds to which speed, the speeds of the motor 504 corresponding to the different taps can be determined empirically, as described in more detail below.

In a simple implementation of the motor control circuitry 202, an interface 520 receives a tap selection input, such as from the air handler monitor module 200 of FIG. 2A. The interface 520 energizes (or, activates) at most one of a set of relays 524-1, 524-2, . . . and 524-*n* (collectively, relays 524). A simple implementation of the interface 520 is therefore a demultiplexer or decoder circuit.

In various implementations, the motor control circuitry 202 may be configured to support more than three taps, so that the motor control circuitry 202 can be used with a larger variety of motors. In such cases, additional relays (not shown) may be included and controlled by the interface 520. For example only, n=5 may be chosen to allow support for motors having up to 5 taps.

Based on the tap selection signal, the interface 520 can energize the relay 524-1 to connect a first lead of the incoming AC power to tap 1 of the motor 504. Similarly, activating the relay 524-2 provides AC power to tap 2 of the motor 504. Further, activating the relay 524-*n* provides AC power to tap n of the motor 504. As shown in FIG. 6, a second lead of the incoming AC power is directly connected to the common terminal of the motor 504.

For example only, the tap selection signal may assume values of 1, 2, 3, . . . , each value indicating an instruction to activate a corresponding one of the relays 524. Meanwhile, another value, such as 0, indicates that all of the relays 524 should be deactivated, de-energizing the motor 504. The control board 112 may generate a signal indicating that the motor 504 should be de-energized.

In various implementations, the motor control circuitry 202 may be used in a retrofit environment, where the control board 112, present in the air handler unit 136 since manufacture, had previously controlled the taps of the motor 504. The control board 112 may have de-energized the circulator blower 108 in response to a variety of conditions. For example, when a start-up sequence of the air handler unit 136 appears to have failed for some reason, the control board 112 may attempt to disable the circulator blower 108. As one example, the control board 112 may deactivate the circulator blower 108 when a pressure decrease is not identified after the inducer blower 132 is activated.

In a retrofit environment, the control board 112 may have individually controlled the taps of the motor 504. After installation of the motor control circuitry 202, the control board 112 may still be energizing pins or leads that were previously connected to the taps of the motor 504. However, these signals may be ignored in favor of the tap selection signal from the air handler monitor module 200.

In other implementations, the tap control signals from the control board 112 may collectively act as the disable signal. For example, when all of the tap control signals from the control board 112 are deactivated, this indicates that the control board 112 does not want the circulator blower 108 to be operating. Therefore, this lack of control signal activation may be interpreted by the interface 520 as a disable signal.

Meanwhile, when the control board 112 indicates that one of the taps should be activated, the present disclosure may ignore which particular tap is chosen, recognizing that the control board 112 has limited understanding of the taps of the motor 504 and limited information about the operating parameters of the overall HVAC system. In other words, when the control board 112 attempts to activate any tap, the actual tap is chosen by the air handler monitor module 200 irrespective of which tap is selected by the control board 112.

In some implementations, such as are discussed above with respect to FIGS. 4 and 5, the motor control circuitry 202 may connect the original control signals to the taps of the motor 504 if the motor control circuitry 202 is de-energized or if the motor control circuitry 202 experiences a failure.

Figure 7A:
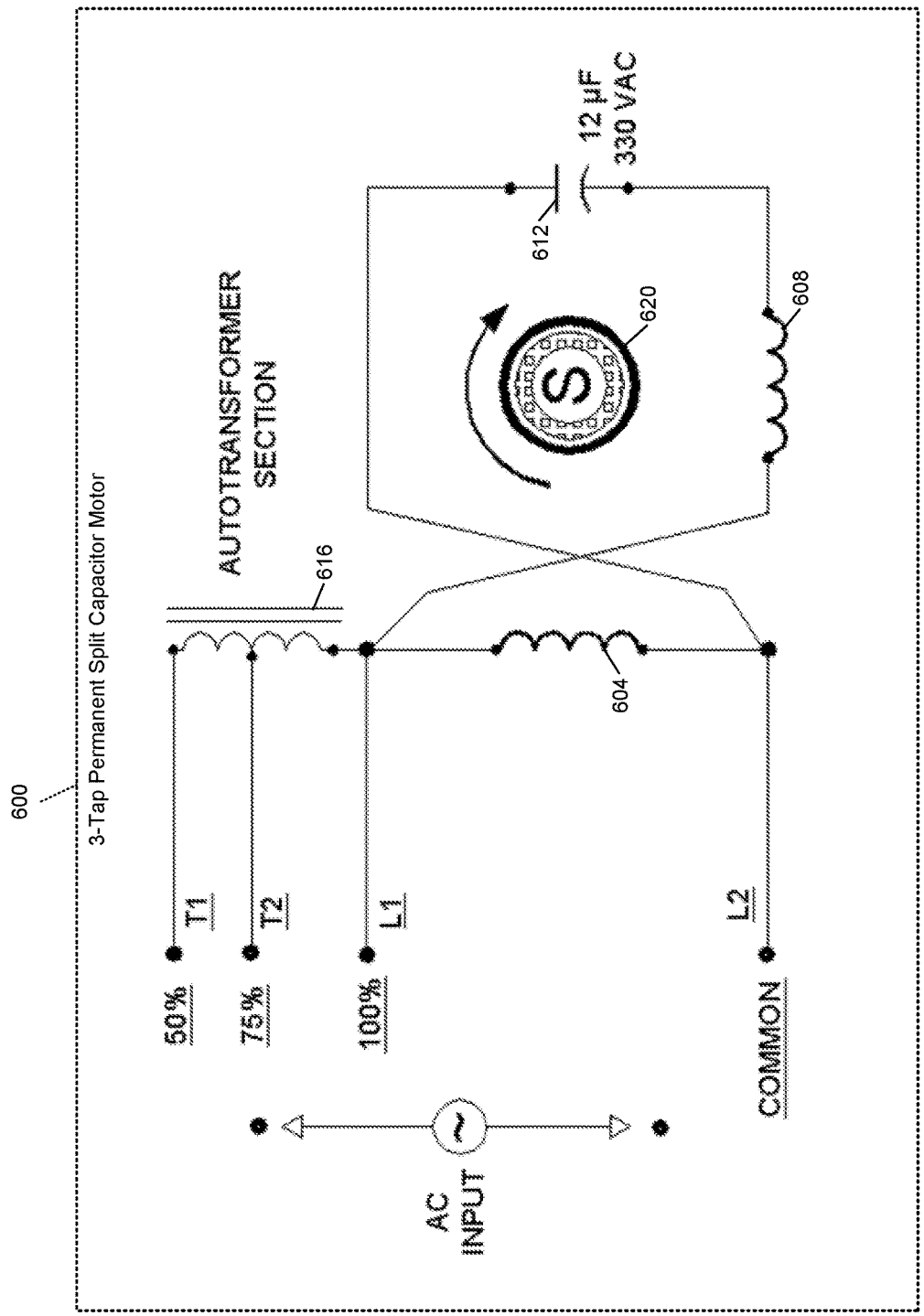
FIG. 7A is a configuration diagram of an example 3-tap Permanent Split Capacitor (PSC) motor.

In FIG. 7A, a high-level example schematic of a 3-tap permanent split capacitor (PSC) motor 600 is shown. The 3-tap PSC motor 600 includes a first winding 604 connected in between a first tap and a common terminal. A second winding 608 is connected between the first tap and a run capacitor 612. The run capacitor 612 is connected in between the second winding 608 and the common terminal. In between the first tap and the third tap, an autotransformer section 616 is present. At an internal tap of the autotransformer section 616, a second tap is connected. Applying power between the common terminal and one of the 3 taps causes a shaft 620 to rotate.

Figure 7B:
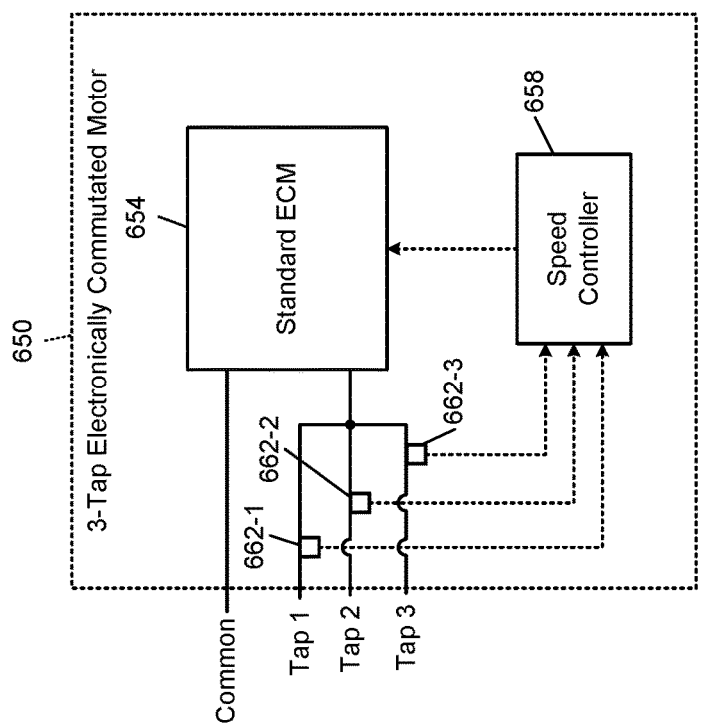
FIG. 7B is a configuration diagram of an example 3-tap electronically commutated Motor (ECM).

In FIG. 7B, an example implementation of a 3-tap electronically commutated motor (ECM) 650 is shown. An ECM generally does not rely on multiple taps for speed control. Instead, control circuitry applies waveforms, such as pulse-width modulated (PWM) signals, to windings of a motor. However, in some situations, such as for repair or retrofit installation, a standard ECM (including its speed controller) 654 may be packaged as the 3-tap ECM 650 to appear electrically analogous to the 3-tap PSC motor 600 of FIG. 7A.

For example, the 3 taps may be connected together to provide power to the standard ECM 654. Meanwhile, a speed controller 658 monitors which of the taps is actually energized and sends a corresponding speed command to the standard ECM 654. The standard ECM 654 then varies the PWM signals to drive the motor at the commanded speed. Energization of the taps may be sensed using current sensors 662-1, 662-2, and 662-3, corresponding respectively to the first, second, and third taps. The speed controller 658 may be configured to request speeds from the standard ECM 654 that correspond to the same speeds that would be achieved by the respective taps on the 3-tap PSC motor 600.

While 3-tap motors are depicted in FIG. 7A and FIG. 7B, other numbers of taps may be used or supported. For example, 2-tap motors, 4-tap motors, and 5-tap motors are also widely available.

Figure 8A:
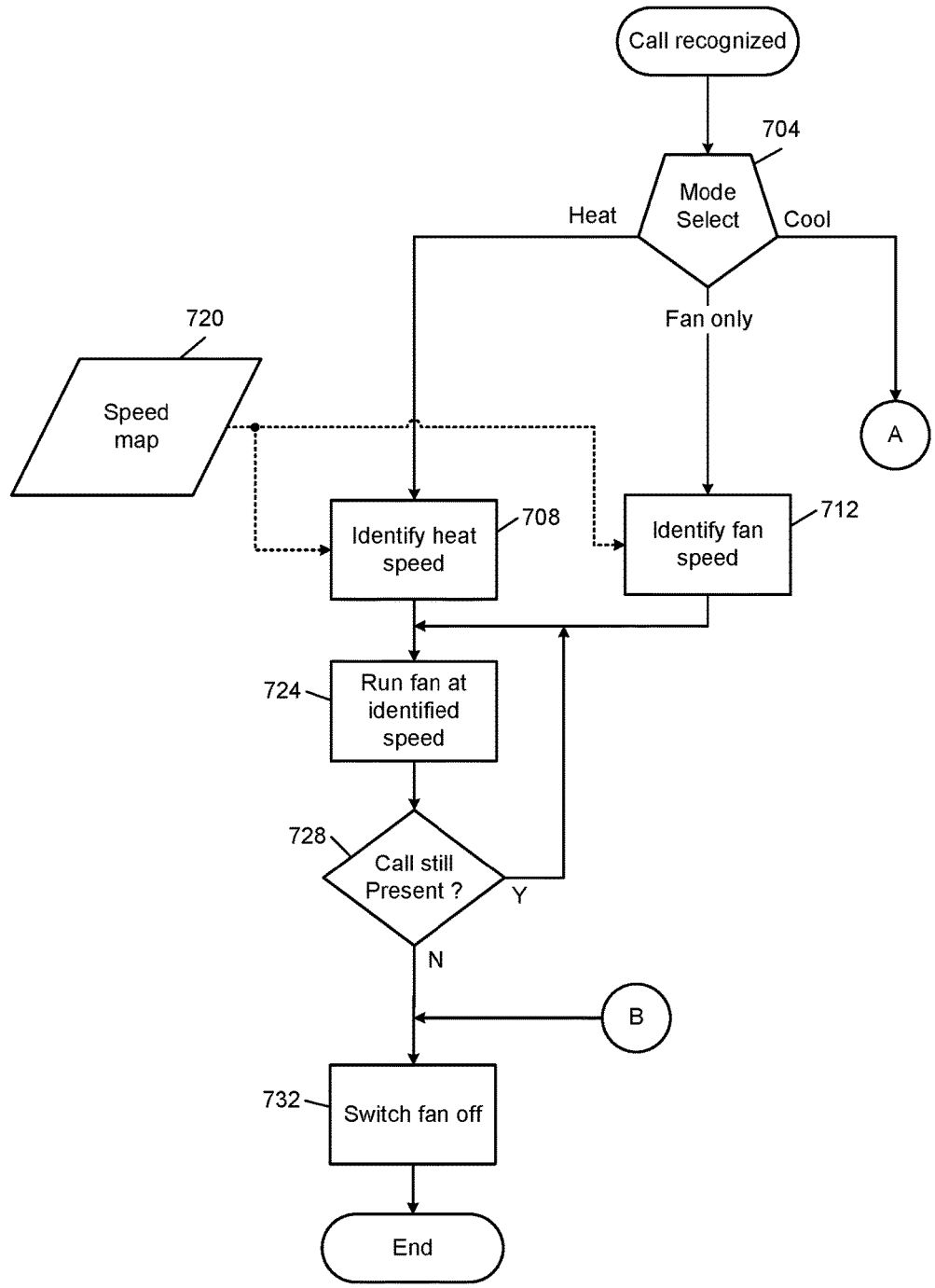
FIG. 8A and FIG. 8B together are a flowchart of example time-based staging operation of an example HVAC system including motor control circuitry.
Figure 8B:
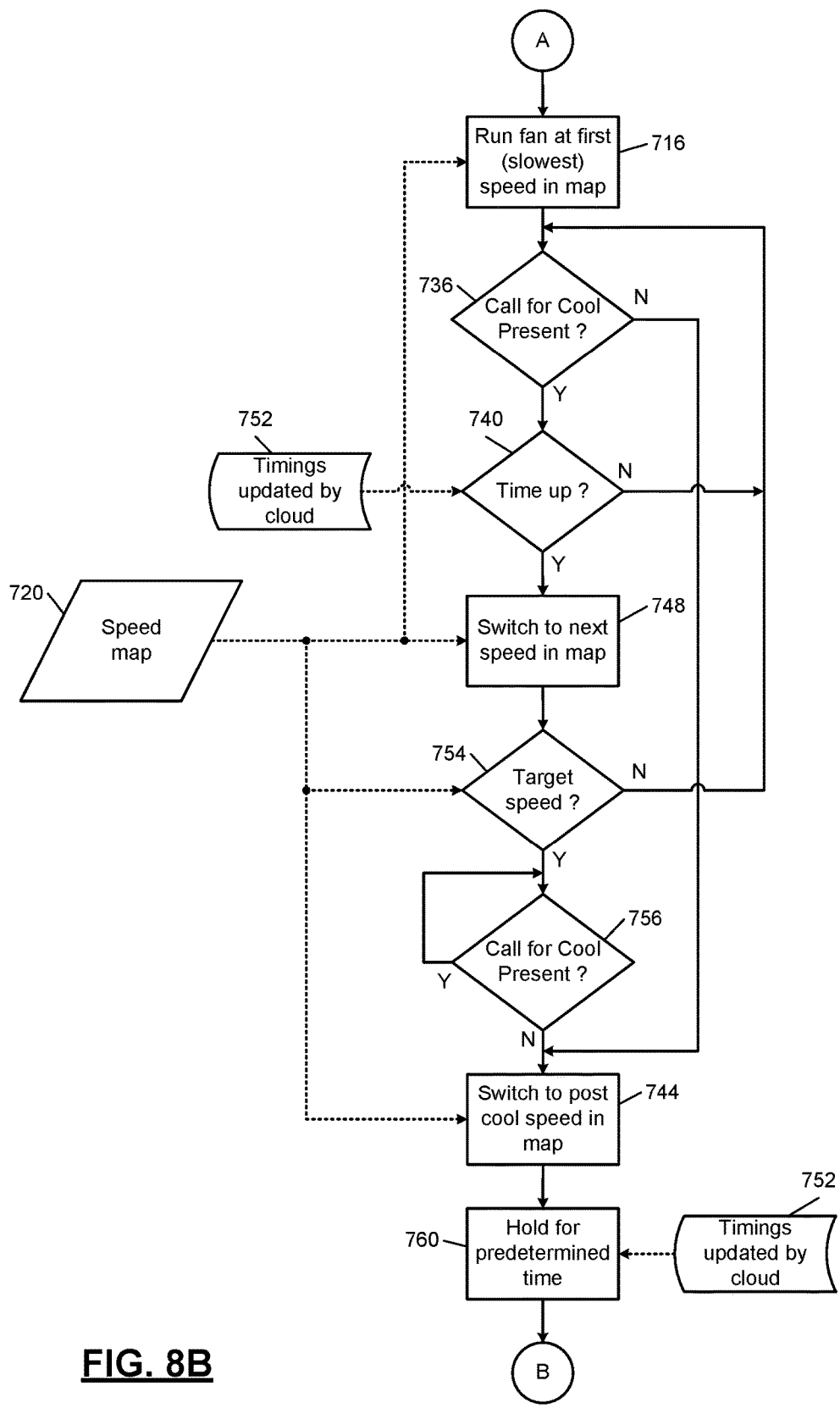

In FIGS. 8A-8B, a flowchart of overall fan control operation after commissioning of the system is shown. In FIG. 8A, control begins at 704 when any call from the thermostat is recognized. At 704, control branches depending on the mode of the received call. If the call is for heat, control transfers to 708; if the call is for fan only, control transfers to 712; and if the call is for cool, control transfers to 716 (FIG. 8B).

At 708, control identifies the speed at which to run the motor during heating. This may be determined by a speed map 720, which may be stored locally and may be updated from a remote server. The speed map 720 identifies what speed the fan should run at for each mode. The speed map 720 may also have a mapping from speeds to physical taps on the motor. After identifying the heat speed at 708, control continues at 724.

At 712, control identifies the speed to run the motor at when fan only is selected. This is simply an issue of air movement and filtration, as there is no heating or cooling that may dictate how much airflow is necessary. Therefore, this fan only speed may be set up by an installer or other HVAC specialist and may be controlled by a user. Control continues at 724.

At 724, the fan is run at the identified speed. At 728, control determines whether the call is still present. If so, control remains at 724; otherwise, control continues at 732. At 732, the fan is switched off by energizing none of the taps of the motor. Control then ends and waits until the next thermostat call is recognized.

In FIG. 8B, at 716, control runs the fan at the first (lowest) speed in the speed map 720. When a cooling cycle is first beginning, circulating air passed through the evaporator at a slower rate will allow the evaporator coil to get down to operating temperature more quickly and to therefore reach peak efficiency more rapidly. As the evaporator coil moves toward the desired operating temperature, the fan speed can be increased. The final speed may be selected based on, for example, humidity because slower airflow across the evaporator removes more moisture from the air.

Control continues at 736, where if the call for cool is still present, control continues at 740; otherwise, control transfers to 744. At 740, control determines whether a time period for the present fan speed has elapsed. If so, control transfers to 748; otherwise, control returns to 736. Time periods are determined from a timings file 752, which may be retrieved from or updated by a remote system (which may be referred to with the shorthand "cloud"). All control data from the cloud, including the timings file 752, may be pre-programmed, such as from the manufacturer. Using the pre-programmed data, multi-speed operation can be performed even before network connectivity is available (or in situations where network connectivity never becomes available).

As a cooling cycle begins, the motor is cycled from the slowest speed to the desired speed, holding each speed for a predetermined period of time. Therefore, when the time is up at 740, control at 748 switches the fan to run at the next speed in the map.

In some implementations, or with some timing files, some speeds may be skipped. This may be indicated in the timings file 752 by setting the time for a certain fan speed to be zero. Further, the speed selected in 716 does not necessarily have to be the slowest speed: instead, a higher speed may be selected. For example, if a cooling cycle had been recently completed, times for each speed may be shortened, and the first speed may be skipped altogether.

Control continues at 754, where if the new speed is the target speed at which the fan should run for the duration of the cooling cycle, control continues at 756. Otherwise, control returns to 736, where the present speed will be held for a respective period of time. At 756, control holds the fan at the target speed until the end of the call for cool.

Once the call for cool is no longer present, control transfers to 744. At 744, control switches to a predetermined post-cooling speed in the speed map 720. For example, the post-cooling speed may be the next slower speed from the target speed. Control continues at 760, where the post-cooling speed is held for a predetermined time, which may be established by the timings file 752. Once that time has lapsed, control continues at 732 in FIG. 8A.

Figure 9A:
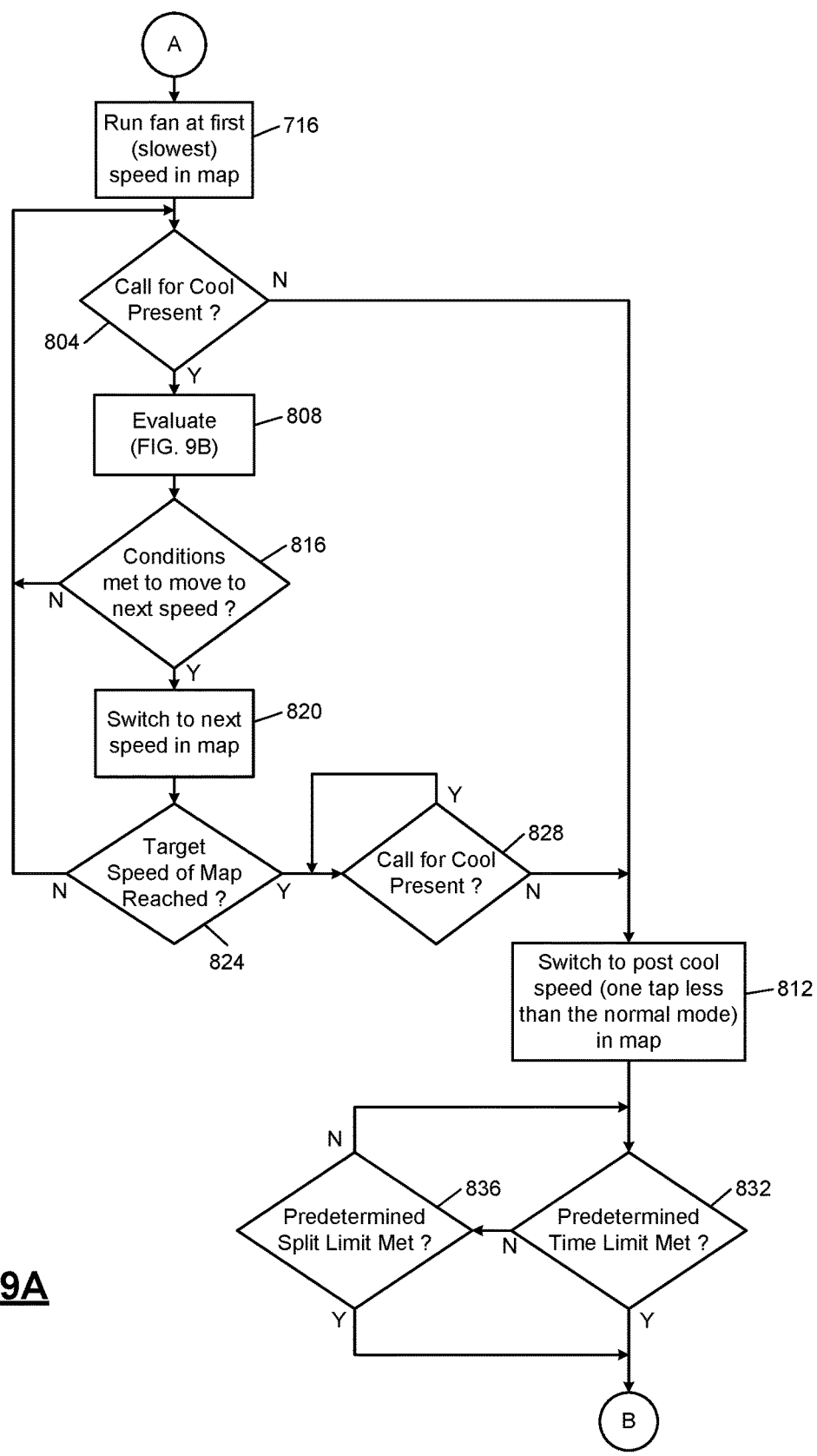
FIG. 9A and FIG. 9B together are a flowchart of example temperature-based staging operation for a call for cooling.

In FIG. 9A, an alternative implementation for handling a call for cool is shown. The flowchart of FIG. 9A can be compared to that of FIG. 8B. For consistency with FIG. 8B, control arrives from FIG. 8A at 716 in FIG. 9A, where the fan is run at the first (slowest) speed in the map. Control continues at 804, where if the call for cool is still present, control transfers to 808; otherwise, control transfers to 812.

Figure 9B:
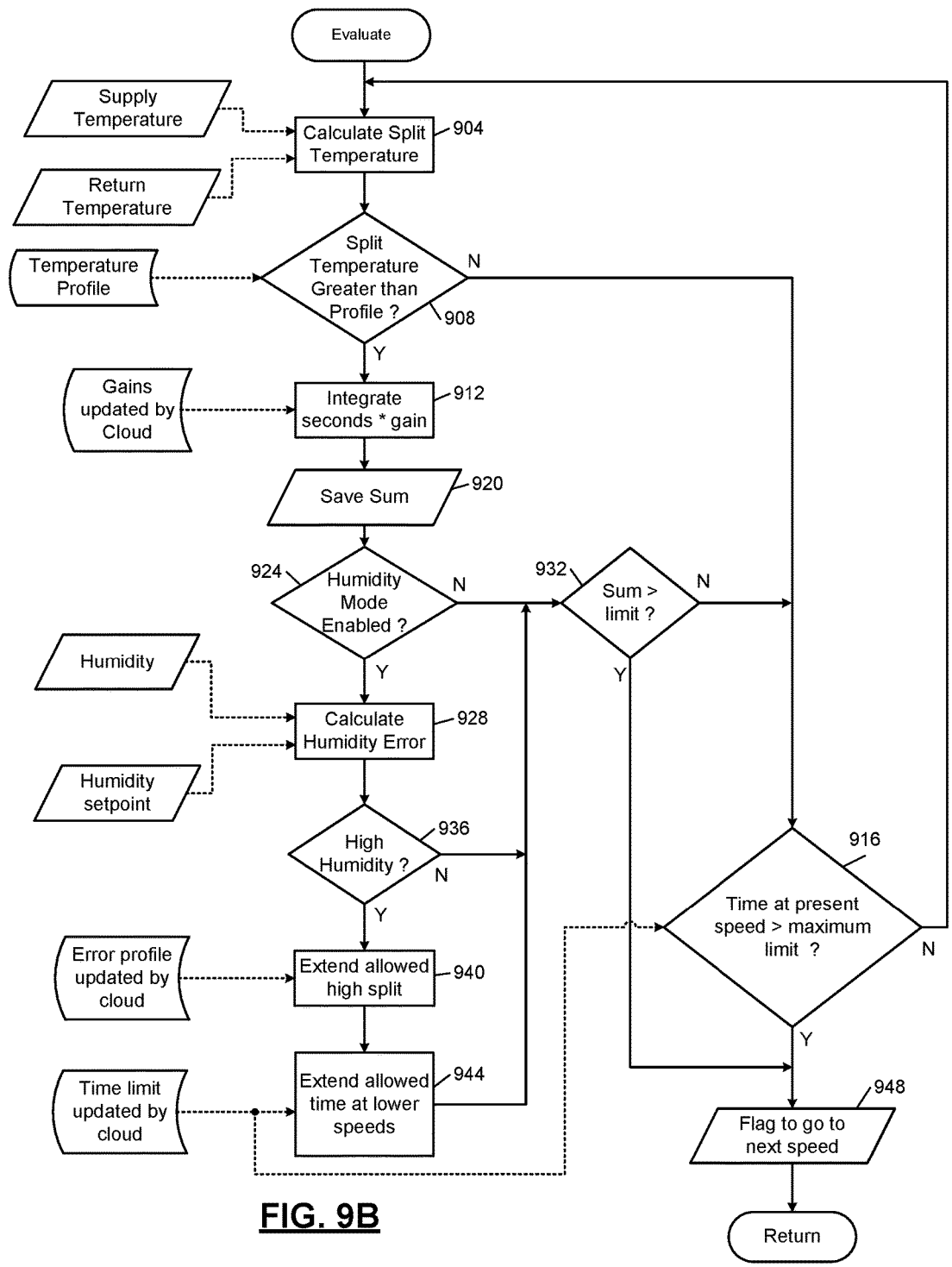

At 808, control evaluates whether the conditions are met to move to the next fan speed. For example only, this determination may be made as shown in FIG. 9B. At 816, if the conditions are met to move to the next speed, control transfers to 820; otherwise, control returns to 804. At 820, control switches to the next faster speed in the map. Control continues at 824, where if the target speed has been reached, control transfers to 828; otherwise, control returns to 804. The target speed is the speed at which the fan should be run while the cooling system is in steady state to maximize efficiency and comfort (including humidity control).

At 828, control determines whether the call for cool is still present. If so, control remains at 828. Once the call for cool is no longer present, control continues at 812. At 812, control switches to a predetermined post-cooling speed. For example, the post-cooling speed may be one speed slower than the normal cooling fan speed. Control continues at 832, where a timer is evaluated. The timer times how long the fan has been running in the post-cooling mode. Once the predetermined time limit is met, control returns to 732 of FIG. 8A. If the time limit has not yet been met, control transfers to 836.

A predetermined temperature split may be defined, where a temperature split is the difference between the temperature of return air arriving at the evaporator and supply air leaving the evaporator. If this predetermined split has been met, control also returns to FIG. 8A; otherwise, control continues at 832. In other words, the conditions in 832 and 836 are both sufficient, and meeting either will allow the fan to be turned off. In other implementations, both conditions are necessary, in which case the fan will shut off only once both conditions are met.

In FIG. 9B, the evaluate operation 808 of FIG. 9A begins at 904. At 904, a split temperature is calculated from a measured supply air temperature and a measured return air temperature. The split temperature is calculated by subtracting the two temperatures. At 908, control compares the calculated split temperature to a temperature profile, which may be a relationship of desired split temperature vs time. The reference point for the time scale may be the time at which the current call for cool arrived.

If the split temperature is greater than the profile, control transfers to 912; otherwise, control transfers to 916. At 912, control integrates the amount of time (which may be in seconds) that the split temperature has been greater than the predefined temperature profile multiplied by a gain factor. The gain factor may be a constant, and may be equal to one, or may be greater than or less than one. For example, the integration may be performed simply by adding the product of time and gain to the prior sum to arrive at the next sum. Control continues at 920, where the sum of the integrating is saved in an accumulator register. The accumulator register may be a hardware register of a processor or a memory location; the value in the accumulator register may initially be written to a hardware register and then stored to the memory location.

At 924, control determines whether a humidity control mode has been enabled. If so, control transfers to 928; otherwise, control transfers to 932. At 928, control calculates humidity error by subtracting a measured humidity from a humidity set point. At 936, control determines whether this humidity error is above a threshold. If so, this is considered a high humidity condition and control transfers to 940; otherwise, control returns to 932.

At 940, control extends the allowed high split temperature by increasing values of the temperature profile used in 908. Additionally or alternatively, at 944, control extends the allowed time a lower speeds by increasing the present maximum time limit as used in 916. At 932, control determines whether the sum from 920 is greater than a predetermined limit. If so, control transfers to 948; otherwise, control transfers to 916. The predetermined limit may be fixed, or may vary based on which speed the motor is running at.

At 948, the split temperature has been greater than the temperature profile for a long enough time that a flag is set indicating the conditions are met to move to the next speed. Control then returns, such as to 816 of FIG. 9A. At 916, control determines whether the time spent at the present speed is greater than a maximum time limit. If so, control transfers to 948; otherwise, control returns without indicating that the conditions are met to move to the next speed. In other words, the conditions of 932 and 916 are each sufficient to allow the next fan speed to be selected. The maximum time limit may be fixed, or may vary based on which speed the motor is running at.

By making the condition at 932 harder to achieve, the adjustment at 940 means that more time may be spent at the current speed. Similarly, by making the time limit of 916 longer, the adjustment at 944 increases the amount of time that the fan can run at the present speed. The present speed is lower than the next speed and low fan speeds cause more humidity to be extracted from air passing over the evaporator. Therefore, in high humidity situations, the system at 940 and 944 increases the amount of time spent at lower speeds do correct for the humidity error.

Figure 10:
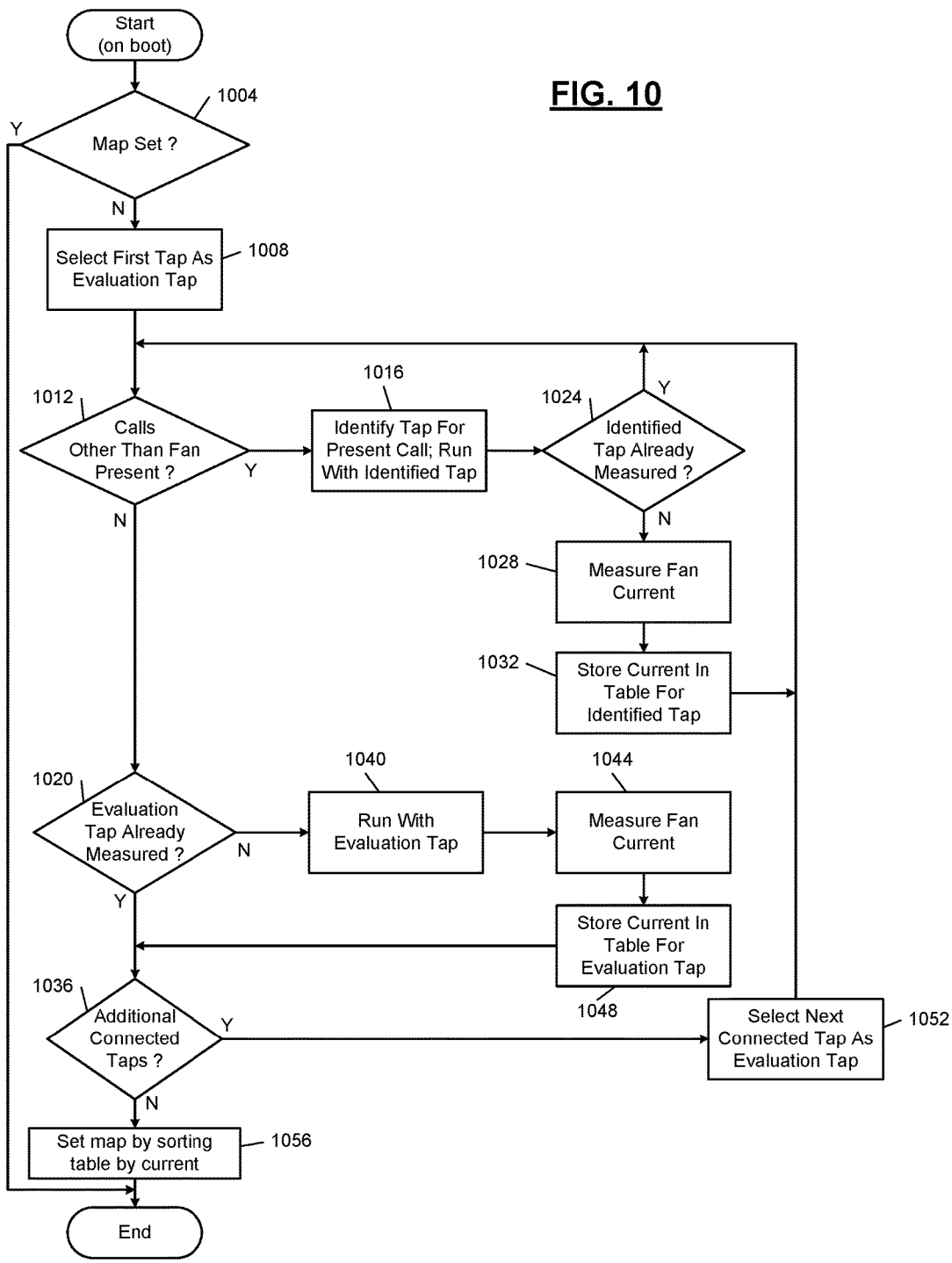
FIG. 10 is a flowchart of example operation for mapping motor taps to fan speeds.

In FIG. 10, an example flowchart example implementation of determining which physical fan tap corresponds to which fan speed is shown. For example, control may begin at each boot-up cycle. At 1004, control determines whether the entire map has already been set. If so, control ends; otherwise, control continues at 1008. At 1008, control selects the first physical motor tap for evaluation.

At 1012, control determines whether calls other than a fan only call are present. If so, control transfers to 1016 to service the present call regardless of which tap is selected for evaluation; otherwise, control transfers to 1020. At 1016, control identifies a motor tap to service the present call, such as a call for heat or a call for cool. Control then runs the fan with the identified tap. Until the map of hardware taps to fan speeds is completed, control may assume that the fan taps are correctly connected in increasing speed order. Then, predetermined speed selections for a call for heat or a call for cool may be serviced by the tap expected to correspond to those speeds.

At 1024, control determines whether measurements have already been performed on the identified tap. If so, control transfers to 1012; otherwise, control transfers to 1028. At 1028, control measures fan current. This measurement may be an aggregate current of multiple devices within the air handler unit 136 (see FIG. 2A). However, even with these other contributions to total current, the total current may still be indicative of the fan current.

At 1032, control stores the measured current in an entry for the identified tap in a table. These currents will be used to identify speeds based on the property that higher speeds require greater currents. Therefore, the taps can be sorted in order of increasing current which will therefore correspond to a sort by increasing speed. Control then returns to 1012.

At 1020, control determines whether the evaluation tap has already been measured. If so, control transfers to 1036; otherwise, control transfers to 1040. At 1040, the evaluation tap has not yet been measured and therefore control runs the fan using the evaluation tap. At 1044, control measures the fan current and at 1048 control creates an entry in the table for the evaluation tap and stores the measured current. Control then continues at 1036.

At 1036, control determines whether there are any additional connected taps that have not yet been measured. If so, control transfers to 1052; otherwise, control transfers to 1056. At 1052, control selects the next connected tap that has not been measured as the evaluation tap. Control then returns to 1012. At 1056, all of the connected motor taps have been measured and therefore the fan speed map is set by sorting the table by current. Sorting may be performed by any suitable process, including bubble sort, insertion sort, or quicksort. In fact, as each current value is measured, a new entry in the fan speed map may be inserted in the correct sorted position, such that the map is already sorted when the last current value is added.

The sorted table then indicates, in increasing order (equivalently, in other implementations, decreasing order) the motor taps corresponding to increasing speeds. The speeds in the table may be absolute speeds, as measured in revolutions per minute (rpm). However, in other implementations, the speeds may simply be comparative, with no information other than that speed 2 is faster than speed 1, speed 3 is faster than speed 2, etc. Control then ends.

Figure 11:
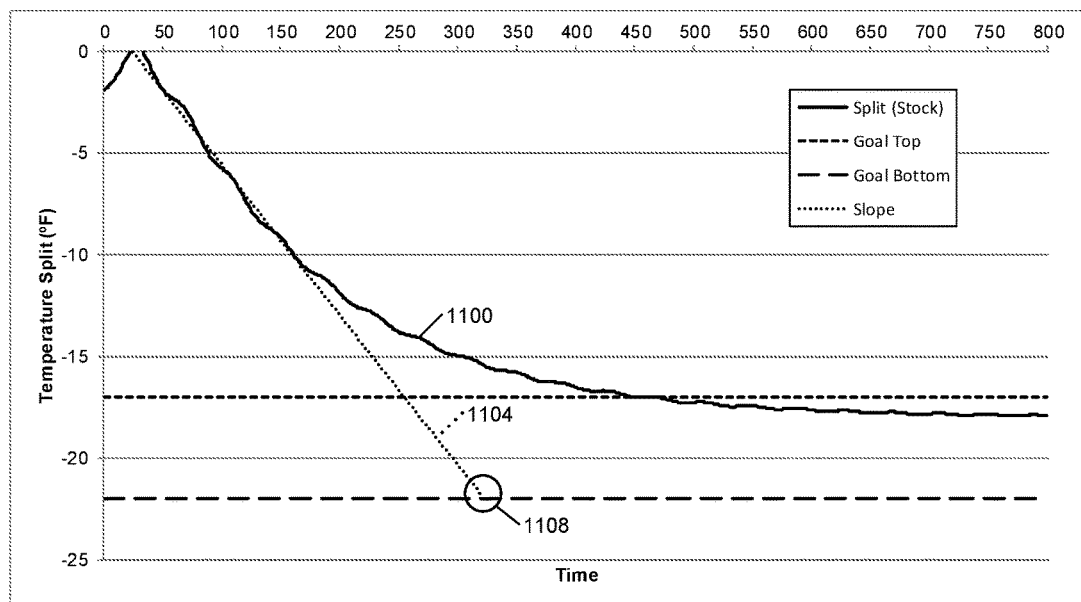
FIG. 11 is a temperature split versus time graph of an example HVAC system using a single fan speed for cooling.

In FIG. 11, a plot of split temperature versus time is shown, with temperature split in degrees Fahrenheit shown on the Y axis and time from compressor startup in seconds shown on the X axis. Bars at −17° F. and −22° F. indicate an envelope within which the split temperature should be located during efficient steady-state operation of a cooling system. Note that the split temperature entered this envelope at approximately 450 seconds.

The measured temperature split from a compressor run is shown by trace 1100. When a best fit line 1104 is calculated for a startup region of the temperature split 1100 (such as between 60 seconds and 120 seconds), the best fit line 1104 can be extrapolated to hit the bottom of the temperature split envelope. This intercept point is labeled as 1108 and the time associated with this intercept may be used in determining when to transition the fan from one speed to the next.

By running the fan at slower speeds for a longer period of time, the temperature split can reach the goal range more quickly. In fact, overachieving with a greater split (below the envelope in FIG. 11) temporarily may be helpful for driving dehumidification early in the compressor run. The temperature split of the compressor system can then be returned to the envelope by increasing the fan speed.

Figure 12:
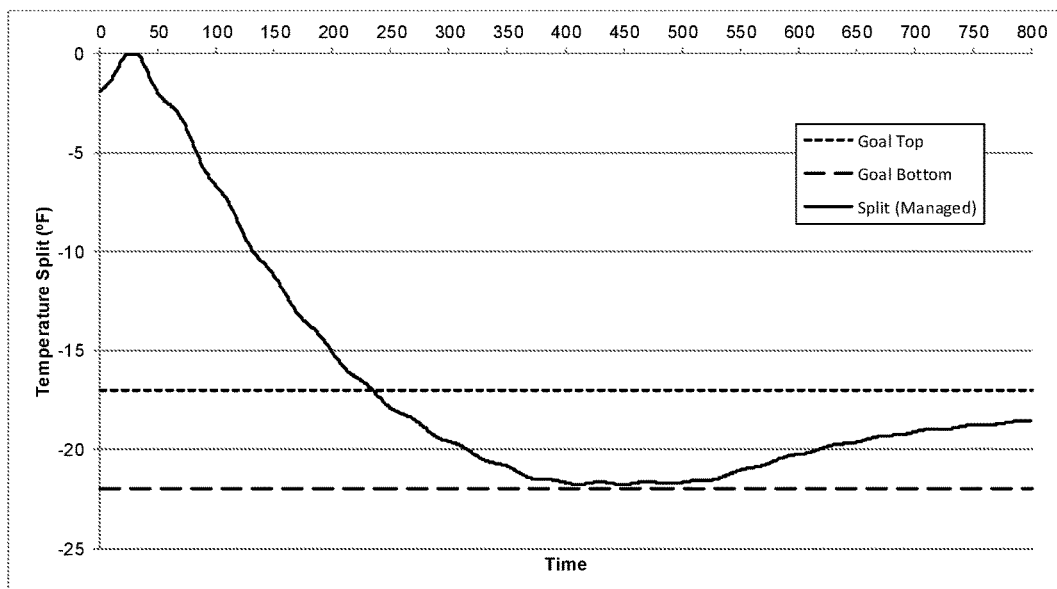
FIG. 12 is a temperature split versus time graph of an example HVAC system having motor control circuitry configured to actively manage the fan speed.
Figure 13:
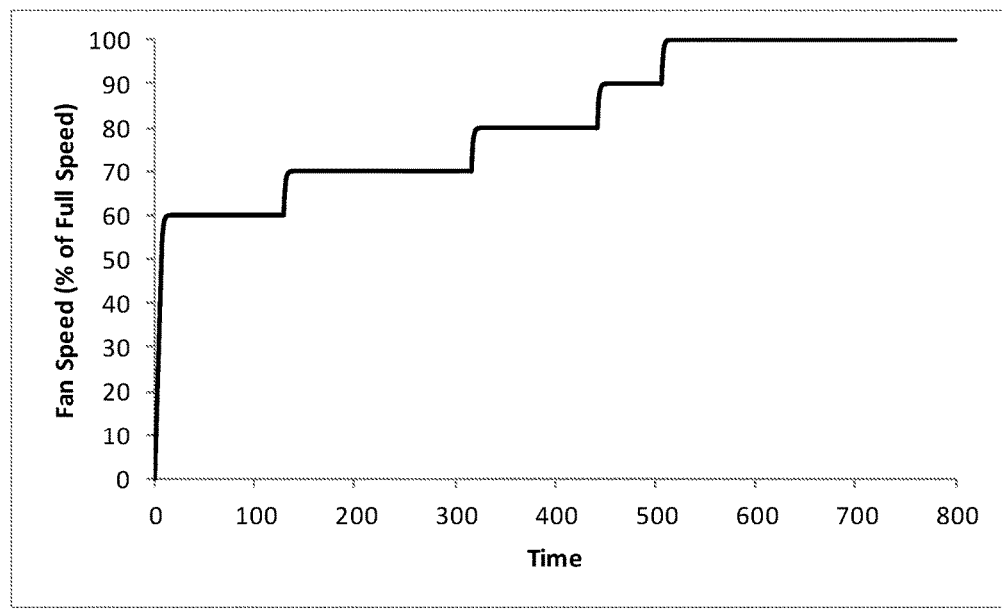
FIG. 13 is a speed versus time graph of an example HVAC system with a 5-speed motor and motor control circuitry configured to actively manage the fan speed.

In FIG. 12, the fan speed is managed to speed the arrival of the split temperature into the envelope. Note that the split temperature enters the envelope in FIG. 12 at approximately 230 seconds. By "managed," the present disclosure means that the fan speed is controlled, such as is shown in FIG. 13. By starting the fan off at a slower speed that is held for a longer time, the split temperature can arrive at the steady-state envelope more rapidly.

FIG. 13 depicts the managed fan speed that results in the split temperature of FIG. 12. The speed is expressed as a percentage of total speed. The four step changes between 60% and 100% correspond to the four transitions between five motor speeds. The transitions may be performed based on times determined according to the following process.

Time Determination

For the first compressor run (and until network connectivity is established), the local air handler control module includes a predefined set of transition times determining when to transition from one motor speed to the next. For example, the predefined transition times may be programmed during manufacturing or may be input as part of commissioning the monitoring system.

After each run of the compressor, data is uploaded to the remote system (or, "cloud") for analysis. The cloud analyzes the data from the compressor run and updates one or more of the transition times. The updated transition times are fed back to the compressor system for use in subsequent compressor runs. The remote system may zero in on one transition at a time. For example, a compressor with five operating speeds allows for four transitions. The first transition (from the slowest speed to the second-slowest speed) may be determined first, the second transition may be determined second, etc. The final transition determined is then the transition from the second-fastest compressor speed to the fastest compressor speed. In various implementations, as the first transition time is being determined, the subsequent transition times are being updated.

Figure 14A:
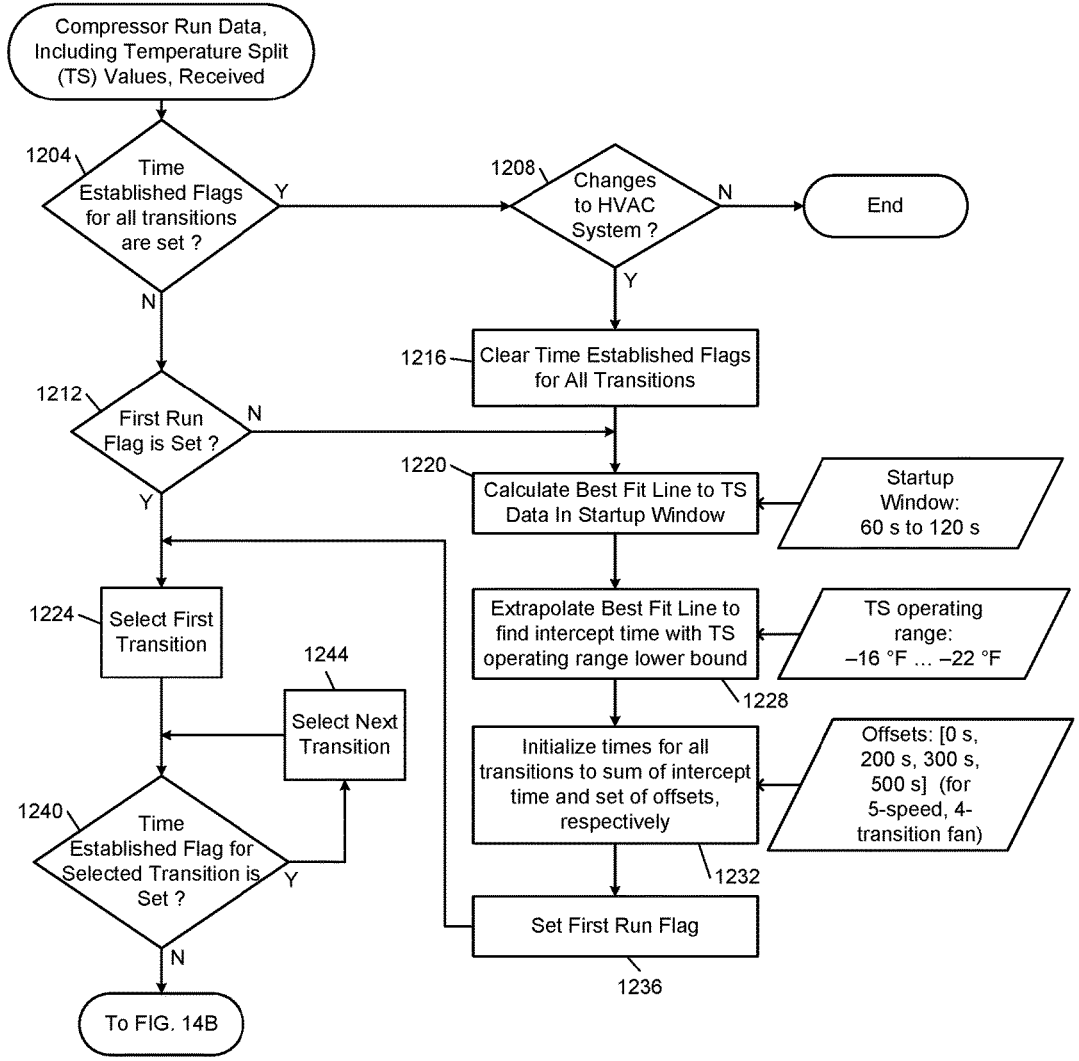
FIG. 14A and FIG. 14B together are a flowchart of an example process for setting the times for the fan to transition between speeds.
Figure 14B:
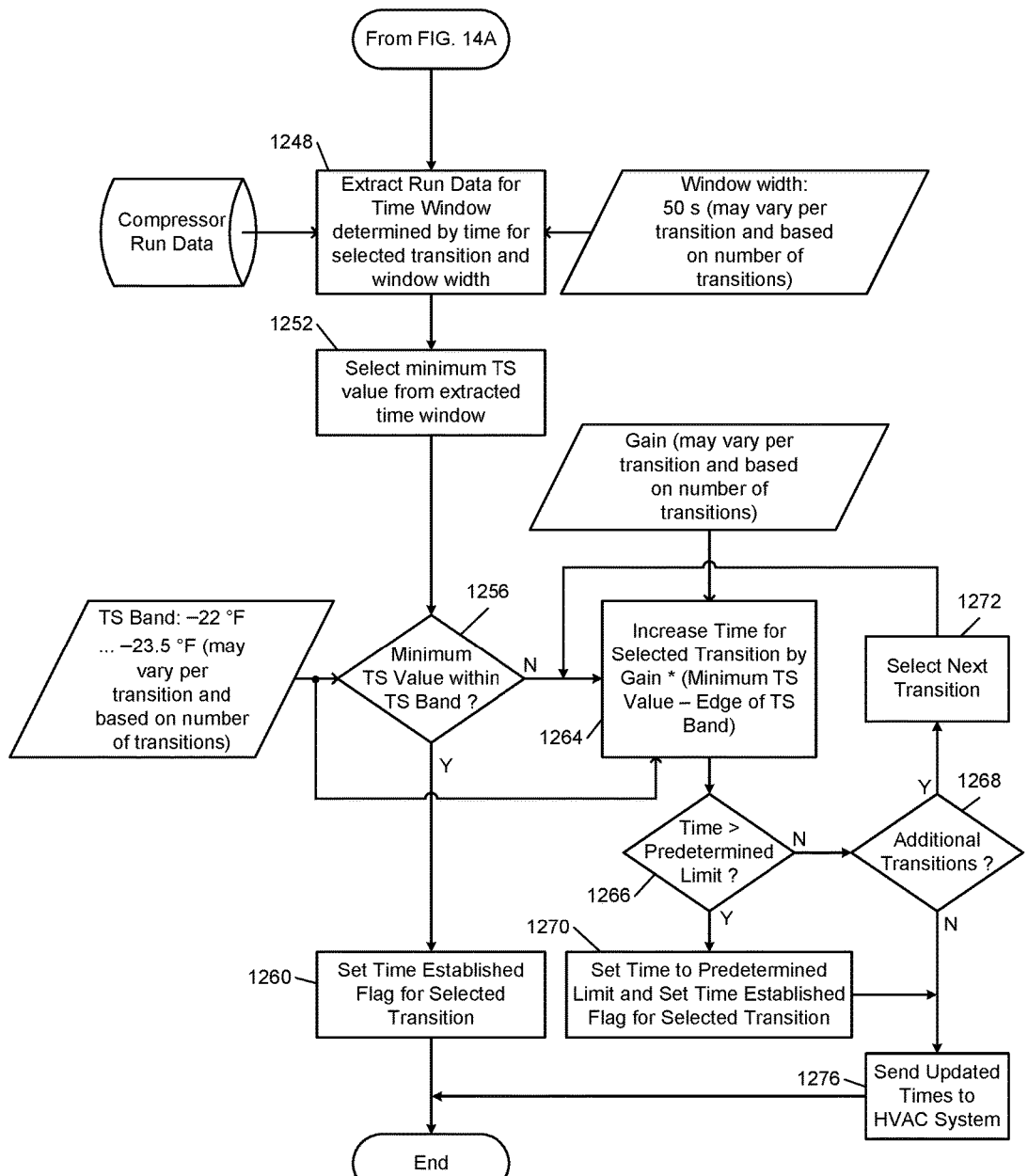

In FIG. 14A and FIG. 14B, a process is shown for determining the specific times to transition the circulator blower (also referred to here as the fan) from one speed to the next. For example, these times may be used by a process such as shown in FIGS. 8A-8B to determine when to transition from one speed to the next. In other words, the process described in FIG. 14A and FIG. 14B may generate the timings file 752 shown in FIG. 8B. The local HVAC system, and more particularly the air handler monitor module 200 of FIG. 2A, may be pre-programmed with control data, including the timings file 752. The process of FIG. 14A and FIG. 14B is then used to update the timings file 752.

Control begins in FIG. 14A when compressor run data is received. The compressor run data may be received after conclusion of a compressor run—that is, once the compressor has turned off. In some implementations, the compressor run data may be received while the compressor is still running. For example, after a predetermined length of time, the remaining compressor run data may not be helpful in establishing speed transitions. Therefore, after a predetermined period of time (such as twenty minutes), the gathered data may be provided as a compressor run.

Upon receipt of compressor run data, control begins at 1204, where control determines whether a time established flag for each of the potential speed transitions has been set. If all the time established flags have been set, control transfers to 1208; otherwise, control transfers to 1212. The number of transitions depends on the number of speeds of the motor. For example, a process such as is disclosed in FIG. 10 may be used to determine how many speeds the blower motor can operate at. In commonly-available systems, the number of speeds varies from 2 to 5.

The number of transitions is one fewer than the number of speeds. For example, a five-speed motor requires four transitions. In some implementations, some speeds may be skipped depending upon operating conditions, in which case there may be fewer transitions. In other operating circumstances and configurations, the fan may never need to transition to the highest speed. In such cases, the number of actual transitions will be fewer than the number of possible transitions.

The time established flags referred to in 1204 indicate whether a specific transition time has been established for one of the potential transitions. As a time is established for each potential transition, the corresponding time established flag is set. The transition times may be set in chronological order, establishing a time for a first transition (from the lower speed to next lower speed) before moving on to establish the transition time for the second transition (that is from the second-slowest speed to the third-slowest speed).

At 1208, all of the time established flags are set, indicating that no further transition time adjustments are needed. However, if changes to the HVAC system are detected at 1208, control transfers to 1216. Otherwise, control ends. Changes to the HVAC system may include replenishment of refrigerant, adjusting of ductwork or registers, or any other service or configuration changes. These changes may be reported by a contractor or homeowner, or may be detected from other measured variables. At 1216, control clears the time established flags for all transitions so that new transitions times can be established based on potential new operating conditions of the HVAC system. Control than continues at 1220.

At 1212, control determines whether a first run flag is set. If so, control transfer to 1224; otherwise, control transfers to 1220. The first run flag determines whether the first run of the compressor has been evaluated. Once the first run of the compressor has been evaluated, the first run flag is set and the initial evaluation is not repeated.

At 1220, the first run flag has not been set or something has changed in the HVAC system and therefore initial analysis is done. Control calculates a best fit line for the temperature split data within a certain window of time. This window of time may be referred to as a startup window and in one example may be from 60 to 120 seconds. The zero reference may be the time at which the compressor begins to run.

At 1228, control extrapolates the best fit line to intercept the lower bound of a predefined temperature split envelope. This intercept time is than used for future calculations. The temperature split envelope may be from −16° F. to −22° F., where the lower bound refers to the most negative number, not the lowest absolute value. That means that the best fit line is extrapolated to, in this example, −22° F.

At 1232, control calculates initial times for all of the transitions based on the sum of the intercept time and respective offsets from a set of offsets. In other words, the initial time for the first transition is equal to the intercept time plus a first offset from the set of offsets, the second transition time is initialized to the sum of the intercept time plus the second offset from the set, etc. In one example for a 5-speed, 4-transition fan, the offsets may be zero seconds, 200 seconds, 300 seconds, and 500 seconds. Control continues at 1236, where control sets the first run flag to indicate that processing of the first compressor run is complete. Control then continues at 1224.

At 1224, control selects the first potential transition (that is, from the lowest speed to the next-lowest speed). Control continues at 1240, where control determines whether the time established flag for the selected transition has been set. If so, control transfers to 1244; otherwise, control transfers to 1248 of FIG. 14B. At 1244, control selects the next transition and returns to 1240.

At 1248 of FIG. 14B, control extracts run data for a time window established by the transition time for the selected transition and a window width. The window width may be a predetermined number, such as 50 seconds. The window width may be adjusted based on the number of transitions, and may vary per transition. In other words, the window width may increase (or decrease) for each subsequent transition. The time for the selected transition may determine a beginning of the window, an end of the window, or middle of the window.

Control continues at 1252, where control identifies the minimum temperature split value from within the extracted time window. At 1256, control determines whether the minimum temperature split value is within a temperature split band. If so, control transfers to 1260; otherwise, control transfer to 1264. The temperature split band may vary based on the number of transitions. For a given number of transitions, the temperature split band may be specified separately for each transition. In one example, the temperature split band is from −22° F. to −23.5° F.

At 1260, because the minimum temperature split value is within the desired band, control leaves the transition time for the selected transition as is and sets the time established flag for the selected transition. Control then ends. At 1264, the temperature split did not reach the temperature split band and therefore the time for the selected transition is increased. The amount of increase is determined by a product of a gain factor and a temperature difference. Temperature difference is between the minimum temperature split value and a high side of the temperature split band. The gain may vary based on the number of the transitions for the system and may also vary for each transition.

Control continues at 1266, where if the increased transition time has not exceeded a predetermined limit, control transfers to 1268; if the increased time has exceeded the predetermined limit, control transfers to 1270. At 1268, if there are subsequent transitions, control transfers to 1272; otherwise, controls transfers to 1276. For example, if the time for a second transition has been increased, and there are third and fourth transitions because the motor is a 5 speed motor, control will transfer to 1272. At 1272, control selects the next transition and returns to 1264.

At 1270, control reduces the transition time back down to the predetermined limit and sets the time established flag for the selected transition. Control then continues at 1276. However, in other implementations, control may proceed from 1270 to 1268 to potentially increase subsequent transition times. At 1276, control sends the updated transition times to the HVAC system for use in future compressor runs. Control then ends.

Additional Features

If the circulator blower motor does not appear to be running—for example, the power consumption of the motor is close to zero—while one of the motor taps is connected to power, this may be an indication of a failure of the motor. For example only, part of the motor winding may have an open circuit. To address this problem, the control system may iterate through the other available taps to see if the motor will rotate when any other tap is connected.

The tap used for heating, and the target tap used for cooling, may be dynamically adjusted based on observed operation of the HVAC system. For example, if measured or inferred airflow is too low, the speed may be increased by selecting the next motor tap. Similarly, excessive airflow (which may result in, during cooling, increased humidity) may be countered by selecting a motor tap for a lower speed.

Some problems with HVAC systems, such as refrigerant undercharge or overcharge, can be ameliorated by adjusting fan speed. For example, in a refrigerant undercharge situation, the fan speed may be reduced.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A circulator blower controller for a circulator blower of a heating, ventilation, and air conditioning (HVAC) system of a building, the circulator blower controller comprising:
   an interface configured to receive a demand signal from a thermostat, the demand signal specifying an operating mode for the HVAC system;
   a switching circuit configured to, in response to a tap selection signal, selectively connect power to one of a plurality of taps of a motor of the circulator blower;
   a data store configured to store a mapping from a plurality of speeds to the plurality of taps; and
   a processor configured to:
      for each tap of the plurality of taps, observe power consumed by the circulator blower while power is connected to the tap by the switching circuit;
      determine the mapping by sorting the taps based on observed power consumption;
      select a first speed based on the demand signal from the thermostat;
      identify a first tap from the mapping based on the first speed; and
      in response to identifying the first tap, generate the tap selection signal to control the switching circuit to connect power to the first tap.

2. A circulator blower system comprising:
   the circulator blower controller of claim 1; and
   the circulator blower, wherein the circulator blower includes (i) the motor and (ii) a fan driven by the motor and configured to circulate air within the building.

3. The circulator blower system of claim 2, wherein the motor comprises at least one of:
   an electronically commutated motor (ECM) configured such that each of the plurality of taps instructs the ECM to run at a respective speed; and
   a permanent split capacitor (PSC) motor including a winding and configured such that each of the plurality of taps corresponds to different points along the winding.

4. The circulator blower system of claim 3, wherein the motor comprises:
   the ECM;
   a plurality of sensors that determine which of the plurality of taps is activated; and
   a speed controller configured to control the ECM to rotate at a speed based on which of the plurality of taps is activated.

5. The circulator blower controller of claim 1, wherein the operating mode is selected from a plurality of operating modes that include a cool mode and a fan only mode.

6. The circulator blower controller of claim 5, wherein the processor is configured to, in response to the demand signal specifying the fan only mode, set the first speed to a speed defined by a user of the building.

7. The circulator blower controller of claim 5, wherein:
   the plurality of operating modes further includes a heat mode; and
   the processor is configured to, in response to the demand signal specifying the heat mode, set the first speed to a speed defined by a user of the building.

8. The circulator blower controller of claim 5, wherein the processor is configured to, in response to the demand signal specifying the cool mode:
   select the first speed according to a predetermined initial speed;
   after a first predetermined period of time following selection of the first speed, select a second speed that is faster than the first speed; and
   in response to selection of the second speed, (i) identify a second tap from the mapping based on the second speed and (ii) generate the tap selection signal to control the switching circuit to connect power to the second tap.

9. The circulator blower controller of claim 8, wherein the predetermined initial speed is a lowest speed of the circulator blower.

10. The circulator blower controller of claim 8, wherein the processor is configured to, in response to the demand signal specifying the cool mode:
    after a second predetermined period of time following selection of the second speed, select a third speed that is faster than the second speed; and
    in response to selection of the third speed, (i) identify a third tap from the mapping based on the third speed and (ii) generate the tap selection signal to control the switching circuit to connect power to the third tap.

11. The circulator blower controller of claim 5, wherein the processor is configured to, in response to the demand signal specifying the cool mode:
    select the first speed according to a predetermined initial speed;
    evaluate an operating condition of the HVAC system;
    in response to the operating condition of the HVAC system meeting a first predetermined criterion, select a second speed that is faster than the first speed; and
    in response to selection of the second speed, identify a second tap from the mapping based on the second speed and generate the tap selection signal to control the switching circuit to connect power to the second tap.

12. The circulator blower controller of claim 11, wherein:
    the operating condition of the HVAC system is temperature split;
    the temperature split is based on a difference between supply air leaving an evaporator coil of the HVAC system and return air arriving at the evaporator coil;
    the processor is configured to integrate time periods during which the temperature split diverged from a predetermined temperature profile; and
    the first predetermined criterion is the integration exceeding a first threshold.

13. The circulator blower controller of claim 12, wherein the processor is configured to, in response to determining that a humidity in a conditioned space of the building exceeds a desired humidity, increase the first threshold.

14. The circulator blower controller of claim 12, wherein the processor is configured to perform the integration by, for each time period during which the temperature split diverged from the predetermined temperature profile, adding a product of a gain factor and a length of the time period to an accumulator register.

15. The circulator blower controller of claim 12, wherein the processor is configured to:
   in response to selection of the second speed, (i) evaluate the operating condition of the HVAC system and (ii) in response to the operating condition of the HVAC system meeting a second predetermined criterion, select a third speed that is faster than the second speed; and
   in response to selection of the third speed, (i) identify a third tap from the mapping based on the third speed and (ii) generate the tap selection signal to control the switching circuit to connect power to the third tap,
   wherein the second predetermined criterion is the integration exceeding a second threshold.

16. The circulator blower controller of claim 11, wherein the processor is configured to, after a first predetermined period of time following selection of the first speed, select the second speed.

17. The circulator blower controller of claim 16, wherein the processor is configured to, in response to determining that a humidity in a conditioned space of the building exceeds a desired humidity, increase the first predetermined period of time.

18. The circulator blower controller of claim 5, wherein the processor is configured to, in response to the demand signal specifying the cool mode:
   selectively determine a refrigerant undercharge condition of the HVAC system; and
   in response to determining the refrigerant undercharge condition, (i) select a slower speed, (ii) identify a second tap from the mapping based on the slower speed, and (iii) generate the tap selection signal to control the switching circuit to connect power to the second tap.

19. The circulator blower controller of claim 1, wherein:
   the processor is configured to, until the mapping includes entries for all of the plurality of taps, observe the power consumed; and
   observing the power consumed includes, while no demand signal is received from the thermostat, iterating through taps of the plurality of taps by generating the tap selection signal to control the switching circuit to connect power to an evaluation tap and observing the power consumed while power is connected to the evaluation tap.

20. The circulator blower controller of claim 1, wherein the processor is configured to generate the tap selection signal to control the switching circuit to connect power to a second tap in response to determining that the motor is not operating while power is connected to the first tapa.

* * * * *